(12) United States Patent
Oshima et al.

(10) Patent No.: US 6,992,154 B2
(45) Date of Patent: Jan. 31, 2006

(54) CYCLIC OLEFIN ADDITION COPOLYMER AND PROCESS FOR PRODUCING SAME, CROSSLINKING COMPOSITION, CROSSLINKED PRODUCT AND PROCESS FOR PRODUCING SAME, AND OPTICALLY TRANSPARENT MATERIAL AND APPLICATION THEREOF

(75) Inventors: Noboru Oshima, Tokyo (JP); Yooichiroh Maruyama, Tokyo (JP); Michitaka Kaizu, Tokyo (JP); Katsutoshi Sawada, Tokyo (JP); Toshihiro Hayashi, Tokyo (JP); Kenzo Ohkita, Tokyo (JP)

(73) Assignee: JSR Corporation, Tokyo (JP)

( * ) Notice: Subject to any disclaimer, the term of this patent is extended or adjusted under 35 U.S.C. 154(b) by 47 days.

(21) Appl. No.: 10/969,065

(22) Filed: Oct. 21, 2004

(65) Prior Publication Data

US 2005/0107552 A1 May 19, 2005

Related U.S. Application Data

(62) Division of application No. 10/241,578, filed on Sep. 12, 2002, now Pat. No. 6,844,403.

(30) Foreign Application Priority Data

| Sep. 13, 2001 | (JP) | ............................. 2001-277847 |
| Nov. 1, 2001  | (JP) | ............................. 2001-336593 |
| Jan. 24, 2002 | (JP) | ............................. 2002-015388 |

(51) Int. Cl.
C08L 5/51 (2006.01)
C08F 4/44 (2006.01)

(52) U.S. Cl. ............ 526/171; 526/281; 524/115; 524/183; 528/115; 528/116; 528/117; 528/118

(58) Field of Classification Search ............ 526/171, 526/281; 524/115, 183; 528/115, 116, 117, 528/118

See application file for complete search history.

(56) References Cited

U.S. PATENT DOCUMENTS

| 5,202,388 A   | 4/1993  | Iio et al.      |
| 6,403,742 B2  | 6/2002  | Oshima et al.   |
| 6,639,021 B2  | 10/2003 | Oshima et al.   |
| 6,670,093 B2  | 12/2003 | Song et al.     |
| 6,790,914 B2  | 9/2004  | Kanamori et al. |
| 2004/0063873 A1 | 4/2004 | Ohkita et al.  |
| 2004/0132243 A1 | 7/2004 | Kurosawa et al.|

FOREIGN PATENT DOCUMENTS

| EP | 1 195 397 | 4/2002  |
| WO | 98/56837  | 12/1998 |

OTHER PUBLICATIONS

U.S. Appl. No. 10/969,065, filed Oct. 21, 2004, Oshima et al.
U.S. Appl. No. 10/466,429, filed Jul. 16, 2003, Ohkita et al.
U.S. Appl. No. 10/515,189, filed Nov. 29, 2004, Oshima et al.
U.S. Appl. No. 10/693,929, filed Oct. 28, 2003, Kurosawa et al.

Primary Examiner—Robert D. Harlan
(74) Attorney, Agent, or Firm—Oblon, Spivak, McClelland, Maier & Neustadt, P.C.

(57) ABSTRACT

The present invention provides a cyclic olefin addition copolymer which has a reactive silyl group having a specific structure, excels in optical transparency, heat resistance, and adhesion, and is capable of producing a crosslinked product having improved dimensional stability, solvent resistance, and chemical resistance. The present invention also provides a process for producing the cyclic olefin addition copolymer, a crosslinking composition, a crosslinked product and a process for producing the same, and an optically transparent material (transparent resin film) comprising the cyclic olefin addition copolymer. The optically transparent material excels in optical transparency and heat resistance, exhibits improved dimensional stability, adhesion, solvent resistance, and chemical resistance, and is capable of improving fragility and preventing occurrence of cracks in the film.

20 Claims, 12 Drawing Sheets

CYCLIC OLEFIN ADDITION COPOLYMER AND PROCESS FOR PRODUCING SAME, CROSSLINKING COMPOSITION, CROSSLINKED PRODUCT AND PROCESS FOR PRODUCING SAME, AND OPTICALLY TRANSPARENT MATERIAL AND APPLICATION THEREOF

This application is a Divisional application of U.S. application Ser. No. 10/241,578, filed on Sep. 12, 2002, now U.S. Pat. No. 6,844,403.

BACKGROUND OF THE INVENTION

1. Field of the Invention

The present invention relates to a cyclic olefin addition copolymer which has a reactive silyl group having a specific structure, excels in optical transparency, heat resistance, and adhesion, and is capable of producing a crosslinked product having improved dimensional stability, solvent resistance, and chemical resistance. The present invention also relates to a process for producing the cyclic olefin addition copolymer, a crosslinking composition, and a crosslinked product and a process for producing the same.

The present invention further relates to an optically transparent material including the cyclic olefin addition copolymer. The present invention still further relates to applications of the optically transparent material such as a substrate film, a polarizing film, a surface protective film, a retardation film, a transparent conductive film, and a light diffusion film for a liquid crystal display device and an EL display device using the optically transparent material.

2. Description of Background Art

In recent years, use of optically transparent resins in the field of optical parts such as lenses or liquid crystal display parts such as backlights, light guiding plates, and substrates, for which inorganic glass has been used, has progressed accompanied by a demand for a decrease in weight and size and an increase in density.

However, further improvement of birefringence, heat resistance, hygroscopic resistance, solvent resistance, chemical resistance, dimensional stability, adhesion, mechanical strength, and the like has been demanded for the resin materials in addition to optical transparency.

As a material excelling in optical transparency. hydrogenated compounds of a ring opening polymer of cyclic olefin compounds or addition polymers of cyclic olefin compounds given below have been proposed.

(1) Hydrogenated Compound of Ring Opening Polymer of Tetracyclododecene or Norbornene Compound Japanese Patent Application Laid-open No. 60-26024, Japanese Patent No. 3050196, Japanese Patent Application Laid-open No. 1-132625, Japanese Patent Application Laid-open No. 1-132626, Japanese Patent Application Laid-open No. 5-214079, etc.

(2) Addition Copolymer of Ethylene and Norbornene Compound or Tetracyclododecene Compound Japanese Patent Application Laid-open No. 61-292601 and Makromol. Chem. Macromol. Symp. Vol. 47, 83 (1991)

(3) Addition Polymer of Norbornene Compound

Japanese Patent Application Laid-open No. 4-63807, Japanese Patent Application Laid-open No. 8-198919, published Japanese translation of PCT International Patent Application No. 9-508649, and published Japanese translation of PCT International Patent Application No. 11-505880

(4) Addition (Co)Polymer of Norbornene Compound Containing Alkoxysilyl Group

A. D. Hennis et al., Am. Chem. Soc. Polymer Preprint 40(2) 782 (1999), WO98/20394, and WO97/20871

Most of the polymers disclosed in (1) and (2) have insufficient heat resistance due to a low glass transition temperature of less than 200° C. Moreover, since these polymers are not crosslinked, these polymers have insufficient solvent resistance, chemical resistance, and dimensional stability.

Japanese Patent Application Laid-open No. 5-214079 describes a reactive silyl group-containing norbornene polymer obtained by hydrosilylation and hydrogenation of a polymer of norbornene monomers having an unsaturated bond in the side chain. However, this application neither describes nor suggests crosslinking of the polymer by utilizing a reactive silyl group. Specifically, solvent resistance, chemical resistance, and dimensional stability of this polymer are insufficient due to the absence of a crosslinked structure.

Moreover, since it is difficult to complete the hydrogenation, this polymer may be colored or deteriorate if oxygen is present at a high temperature.

The polymer disclosed in (3) has heat resistance. However, it is difficult to crosslink the polymer due to the absence of an alkoxysilyl group. This results in insufficient solvent resistance, chemical resistance, and dimensional stability.

The addition polymer disclosed in (4) has transparency and heat resistance and exhibits adhesion due to the presence of an alkoxysilyl group. However, Japanese Patent Application Laid-open No. 7-196736 neither describes nor suggests crosslinking of the polymer by utilizing a alkoxysilyl group. Specifically, since the polymer is not crosslinked, problems relating to solvent resistance, chemical resistance, and dimensional stability may occur.

A cyclic olefin addition copolymer containing a reactive sylil group and a crosslinked product of the copolymer obtained by using a photoacid generator are described in WO97/20871 and WO98/20394. However, in the case of a sheet or a film having a large thickness, it is difficult to obtain a uniform crosslinked structure by using a method of crosslinking the copolymer by irradiation using a photoacid generator, since the crosslinking reaction mainly proceeds only on the surface. In addition, since the crosslinking reaction proceeds by light if the photoacid generator is used, the copolymer must be shaded during storage or processing. This results in inferior handling capability.

The present inventors have conducted extensive studies to solve the above problems. As a result, the present inventors have found that a crosslinked product excelling in optical transparency, heat resistance, and adhesion, exhibiting improved dimensional stability, solvent resistance, and chemical resistance, and capable of improving fragility and preventing occurrence of cracks in the film can be obtained by using a composition comprising a cyclic olefin addition copolymer which has a reactive silyl group having a specific structure and a specific compound. This finding has led to the completion of the present invention.

The present inventors have prepared an optically transparent material capable of solving the above problems by using a film or a sheet including the composition.

A liquid crystal display device and an EL display device are formed by using various parts and materials. In the liquid crystal display device, a liquid crystal, a liquid crystal alignment film, a liquid crystal substrate, a transparent electrode, a color filter, a polarizing film, a light guiding plate, a transparent conductive film, a retardation film, a surface protective film, a light diffusion film, a prism sheet, a spacer, a sealant, and the like are used. A liquid crystal display device is completed by assembling these parts and attaching module parts such as a driver IC, a printed board, and a backlight. In the EL display device, electroluminescence (EL), a polarizing film, a retardation film, a transparent electrode, and the like are used. An EL display device is completed by assembling these parts.

A polarizing film divides incident light into two polarized components which intersect each other. The polarizing film allows one of the two polarized components to pass therethrough, and absorbes or disperses the other polarized component. As the polarizing film, a film obtained by causing molecules of a polyvinyl alcohol film or the like to be oriented in a specific direction and a dichromatic substance such as polyiodine or a pigment to be absorbed on the film is used. However, such a polarizing film has insufficient mechanical strength in the direction of the transmission axis and shrinks due to heat or moisture. Therefore, a surface protective film is generally provided on each side of the polarizing film as a protective layer.

The surface protective film must have low birefringence, heat resistance, low moisture absorption, mechanical strength, surface smoothness, high resolution, adhesion to a tackiness agent, and the like. Conventionally, a triacetyl cellulose (TAC) film which is manufactured by using a casting method and has low birefringence and excellent surface smoothness has been used as the surface protective film. However, the TAC film has insufficient durability, heat resistance, mechanical resistance, birefringence, and adhesion to a tackiness agent under high temperature and high humidity conditions. Therefore, a material exhibiting higher heat resistance has been demanded.

A retardation film is used in an STN liquid crystal display device in order to compensate for coloring caused by wavelength dependency of the refractive index due to twisting of a liquid crystal molecule. The retardation film must have uniform birefringence over the entire surface and show no change in optical characteristics even under severe high temperature and high humidity conditions in order to obtain a vivid color and a precise image. In the liquid crystal display device, the polarizing film is layered on the retardation film through an adhesive layer. As the retardation film, a stretched and oriented polycarbonate (PC) film is generally used. However, since the PC film has a photoelastic coefficient as large as $9 \times 10^{-12}$ cm$^2$/dyn, the birefringence of the PC film is excessively increased, becomes nonuniform, or is changed due to only a small amount of stress occurring during assembling or due to environmental changes. Moreover, since the PC film has low surface hardness, problems may occur when forming the film or assembling the device. Therefore, a novel material capable of replacing the PC film has been demanded.

A transparent conductive film has a structure in which a transparent conductive film is layered on a transparent film substrate. Excellent heat resistance, surface smoothness, optical characteristics, and moisture resistance are necessary for the transparent film substrate. Conventionally, polyethersulfone (PES) and polyarylate (PAR) have been used as the transparent film substrate. However, the PES film has inferior transparency and the PAR film tends to cause optical distortion to occur. Therefore, a complicated technique is necessary for obtaining a transparent optically uniform film.

A light diffusion film is layered on the backlight of the liquid crystal display device in order to diffuse light or improve brightness. The light diffusion film is generally formed by forming a fine pattern on the surface of a transparent sheet or film by embossing or applying a photocurable resin. As a substrate for the light diffusion film, PC or polyethyleneterephthalate (PET) has been used. However, the PC film may be easily damaged due to low surface hardness. This may cause transparency to be impaired when forming a fine pattern or assembling the display device due to damage to the film. Since the PET film has insufficient transparency, a liquid crystal display device using the PET film lacks luminance, whereby the image quality may be impaired. Moreover, since the PET film has insufficient heat resistance, it is difficult to form a uniform fine pattern due to occurrence of warping of the film when forming a fine pattern.

A prism sheet collects diffused light passing through the light diffusion film at an angle of view of the liquid crystal display device and improves brightness of the liquid crystal display device. The prism sheet is used for a large-screen color STN display and a color TFT display. The prism sheet is formed by providing the PC film with a prism angle. At present, further improvement of brightness of the liquid crystal display device by improving optical nonuniformity and light transmissivity has been demanded.

Various types of films with a thickness of about 10–500 $\mu$m used for the liquid crystal display device and the EL display device are formed of a transparent resin which satisfies characteristics necessary for each film. As the transparent resin, an acrylic resin such as polymethylmethacrylate, a polycarbonate (PC) resin, a polyethyleneterephthalate (PET) resin, a polyethersulfone (PES) resin, and a polyarylate (PAR) resin are used. However, the PC resin and the polyester resin have large birefringence. The acrylic resin exhibits insufficient heat resistance and moisture resistance. The heat resistance of the PES resin is limited to 160–170° C. or less.

As a substrate film for an antireflection film, a film formed of a transparent resin such as PET, PC, and polymethylmethacrylate (PMMA) is widely used. The antireflection film formed on such a film may be a single-layer film or a multi-layer film consisting of two or more layers. Reflection of light over a broader wavelength range can be prevented as the number of layers is increased. However, since transparency is decreased as the number of layers is increased, transparency of the substrate is particularly demanded. The antireflection film is mainly used for displays. If the antireflection film has high birefringence, it is difficult to obtain a fine image due to distortion of the image. Therefore, a uniform antireflection film having low birefringence over the entire film has been demanded.

An increase in the size of the screen, a decrease in weight, an increase in brightness of the screen, durability under severe conditions, and the like have been demanded for the liquid crystal display device and the EL display device. Therefore, films for liquid crystal display devices and EL display devices formed of a transparent resin having excellent characteristics in comparison with conventional transparent resins have been demanded.

A conventional resin film has problems relating to fragility, occurrence of cracks, and the like. In order to use a transparent resin film as the material for the liquid crystal display device and the EL display device, it is necessary to prevent occurrence of cracks when assembling the display device or using the resulting product to provide a material which can withstand physical impact.

The present inventors have found that a transparent resin obtained by the present invention can solve the above problems relating to conventional resins which have been utilized as the material for a film for display devices, such as cyclic olefin copolymer (ring-opening polymer) resin, polycarbonate (PC) resin, triacetylcellulose (TAC) resin, polyethersulfone (PES) resin, and terephthalate (PET) resin, and can be applied to an optically transparent material such as a substrate film, polarizing film, surface protective film, retardation film, transparent conductive film, and light diffusion film. This finding has led to the completion of the present invention.

SUMMARY OF THE INVENTION

A cyclic olefin addition copolymer of the present invention comprises a repeating unit (a) shown by the following formula (1) and a repeating unit (b) shown by the following formula (4), and has a number average molecular weight of 10,000 to 1,000,000:

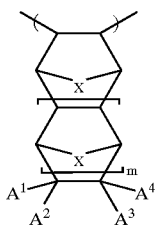

(1)

wherein $A^1$ to $A^4$ individually represent a hydrogen atom, a halogen atom, an alkyl group, alkenyl group, cycloalkyl group, or aryl group having 1–20 carbon atoms, or a reactive silyl group shown by the following formula (2) or (3), provided that at least one of $A^1$ to $A^4$ represents the reactive silyl group, X represents —$CH_2$— or —O—, and m is either 0 or 1;

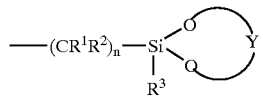

(2)

wherein $R^1$ to $R^3$ individually represent a hydrogen atom or a hydrocarbon group having 1–20 carbon atoms, n is an integer from 0 to 5, and Y represents a hydrocarbon residue of an aliphatic diol, an alicyclic diol, or an aromatic diol having 2–20 carbon atoms;

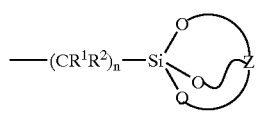

(3)

wherein $R^1$ and $R^2$ individually represent a hydrogen atom or a hydrocarbon group having 1–20 carbon atoms, n is an integer from 0 to 5, and Z represents a hydrocarbon residue of an aliphatic triol, an alicyclic triol, or an aromatic triol having 4–20 carbon atoms;

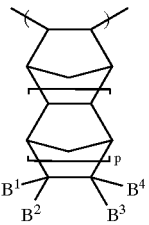

(4)

wherein $B^1$ to $B^4$ individually represent a hydrogen atom, a substituent selected from a halogen atom, an alkyl group, cycloalkyl group, aryl group, alkenyl group, halogenated hydrocarbon group, alkoxy group, and allyloxy group having 1–20 carbon atoms, or a polar group shown by —$(CH_2)_k$ Y' (wherein Y' represents —$C(O)OR^4$ or —$OC(O)R^5$, $R^4$ and $R^5$ represent a substituent selected from an alkyl group, alkenyl group, cycloalkyl group, and aryl group having 1–20 carbon atoms, and halogen substituted groups of these, and k is an integer from 0 to 5), $B^1$ and $B^2$ or $B^3$ and $B^4$ may form an alkydenyl group, $B^1$ and $B^3$, $B^1$ and $B^4$, $B^2$ and $B^3$, or $B^2$ and $B^4$ may form a cycloalkylene group or a cycloalkenylene group, and p is an integer from 0 to 2.

It is preferable that the diol residue in the reactive silyl group shown by the formula (2) be a diol residue having 2–4 carbon atoms which forms a cyclic structure with the Si atom from the viewpoint of the polymerization yield of the cyclic olefin addition copolymer. The content of the repeating unit (a) and the repeating unit (b) in the cyclic olefin addition copolymer of the present invention is preferably 0.5–30 mol % and 60–99.5 mol %, respectively. The glass transition temperature of the cyclic olefin addition copolymer of the present invention is preferably 200–400° C.

The cyclic olefin addition copolymer of the present invention may further comprise a structural unit (c) shown by the following formula (7):

$$—CH_2—CH(R^6)—$$ (7)

wherein $R^6$ represents a hydrogen atom, or a substituent selected from an alkyl group, phenyl group, alkyl substituted phenyl group, and trialkyl substituted silyl group.

A crosslinking composition of the present invention comprises the above cyclic olefin addition copolymer, and at least one compound selected from the group consisting of a metal compound, an inorganic acid and/or an organic acid, a compound which functions as an acid by heating at 50° C. or more, and a compound which functions as an acid by heating at 50° C. or more in the presence of water or vapor. If at least one compound selected from the group consisting of a metal compound, an inorganic acid and/or an organic acid, a compound which functions as an acid by heating at 50° C. or more, and a compound which functions as an acid by heating at 50° C. or more in the presence of water or vapor is added to the cyclic olefin addition copolymer to prepare a composition, the cyclic olefin addition copolymer can be crosslinked at a comparatively low temperature of 50–200° C. for a short period of time. Therefore, the resulting crosslinked product is not substantially affected by oxidation deterioration due to heat and maintains excellent optical characteristics of the cyclic olefin addition copolymer. Moreover, the crosslinked product has improved heat resistance and excels in dimensional stability, solvent resistance, and chemical resistance. The reactive silyl group having a specific structure in the copolymer not only contributes to crosslinking of the cyclic olefin addition copolymer, but also increases adhesion and miscibility with other materials. In addition, since the reactive silyl group in the cyclic olefin addition copolymer has a specific structure, a composition prepared by combining the cyclic olefin addition copolymer with the above compounds has storage stability, handling capability, and crosslinking activity in good balance.

The metal compound used in the crosslinking composition of the present invention may be at least one compound selected from an alkoxy compound, allyloxy compound, thiol compound, organic carboxylate, oxide, halide, and β-diketone compound of a metal selected from Sn, Al, Ga, Zn, Ca, Ba, Ti, Zr, V, Sb, Sc, Ce, Nd, Sm, Y, and Yb.

The organic acid and/or inorganic acid used in the crosslinking composition of the present invention may be at least one compound selected from hydrochloric acid, sulfuric acid, hydrofluoric acid, tetrafluoroboric acid, phosphorous acid, an organic carboxylic acid, an organic sulfonic acid, an organic sulfinic acid, and an organic phosphoric acid.

The compound which functions as an acid by heating at 50° C. or more used in the crosslinking composition of the present invention may be at least one compound selected from an aromatic sulfonium salt, an aromatic ammonium salt, an aromatic pyridinium salt, an aromatic phosphonium salt, an aromatic iodonium salt, a hydrazinium salt, and an iron salt of metallocene, for which a counter anion is selected from $BF_4$, $PF_4$, $AsF_6$, $SbF_6$, and $B(C_6F_5)_4$.

The compound which functions as an acid by heating at 50° C. or more in the presence of water or vapor used in the crosslinking composition of the present invention may be at least one compound selected from a trialkylphosphite, a triarylphosphite, a dialkylphosphite, a monoalkylphosphite, a hypophosphite, an ester of an organic carboxylic acid and a secondary or tertiary alcohol, a hemiacetal ester of an organic carboxylic acid, and a trialkylsilyl ester of an organic carboxylic acid.

The crosslinking composition of the present invention may further comprise at least one compound selected from a polyfunctional alkoxy compound of a metal selected from Si, Al, Ti, and Zr, and a condensation product of a polyfunctional alkoxy compound of these metals. Addition of such a compound enables provision of a crosslinked product having a crosslinked structure effective for improving dimensional stability, solvent resistance, and chemical resistance.

The crosslinking composition of the present invention may further comprise at least one metal oxide having an average particle diameter of 200 nm or less selected from silica, alumina, zirconia, titania, diatomite, montmorillonite, and tin oxide. Since such a metal oxide bonds to the reactive silyl group in the cyclic olefin addition copolymer to form a crosslinked structure, a crosslinked structure effective for improving dimensional stability, solvent resistance, and chemical resistance can be easily obtained.

The present invention provides a process for producing a cyclic olefin addition copolymer which comprises a repeating unit (a) shown by the following formula (1) and a repeating unit (b) shown by the following formula (4), and has a number average molecular weight of 10,000 to 1,000,000:

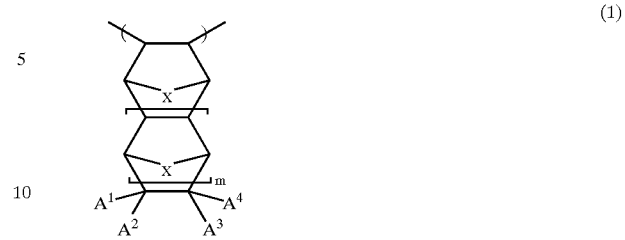

wherein $A^1$ to $A^4$ individually represent a hydrogen atom, a halogen atom, an alkyl group, alkenyl group, cycloalkyl group, or aryl group having 1–20 carbon atoms, or a reactive silyl group shown by the following formula (2) or (3), provided that at least one of $A^1$ to $A^4$ represents the reactive silyl group, X represents —$CH_2$— or —O—, and m is either 0 or 1;

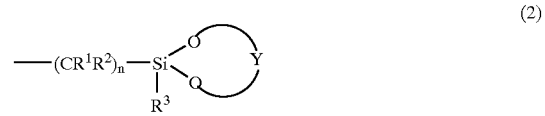

wherein $R^1$, $R^2$, and $R^3$ individually represent a hydrogen atom or a hydrocarbon group having 1–20 carbon atoms, n is an integer from 0 to 5, and Y represents a hydrocarbon residue of an aliphatic diol, an alicyclic diol, or an aromatic diol having 2–20 carbon atoms;

wherein $R^1$ and $R^2$ individually represent a hydrogen atom or a hydrocarbon group having 1–20 carbon atoms, n is an integer from 0 to 5, and Z represents a hydrocarbon residue of an aliphatic triol, an alicyclic triol, or an aromatic triol having 4–20 carbon atoms;

wherein $B^1$ to $B^4$ individually represent a hydrogen atom, a substituent selected from a halogen atom, an alkyl group, cycloalkyl group, aryl group, alkenyl group, halogenated hydrocarbon group, alkoxy group, and allyloxy group having 1–20 carbon atoms, or a polar group shown by —(CH$_2$)$_k$ Y' (wherein Y' represents —C(O)OR$^4$ or —OC(O)R$^5$, R$^4$ and R$^5$ represent a substituent selected from an alkyl group, alkenyl group, cycloalkyl group, and aryl group having 1–20 carbon atoms, and halogen substituted groups of these, and k is an integer from 0 to 5), B$^1$ and B$^2$ or B$^3$ and B$^4$ may form an alkydenyl group, B$^1$ and B$^3$, B$^1$ and B$^4$, B$^2$ and B$^3$, or B$^2$ and B$^4$ may form a cycloalkylene group or a cycloalkenylene group, and p is an integer from 0 to 2;

the process comprising copolymerizing a specific monomer (1) having a reactive silyl group shown by the following formula (5) and a specific monomer (2) shown by the following formula (6) in the presence of a polymerization catalyst which comprises at least one compound selected from transition metal compounds of Ni, Co, and Pd:

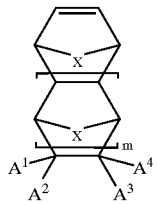

(5)

wherein A$^1$, A$^2$, A$^3$, A$^4$, X, and m are the same as defined for the formula (1);

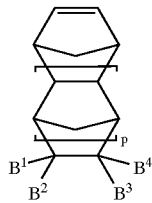

(6)

wherein B$^1$, B$^2$, B$^3$, B$^4$, and p are the same as defined for the formula (4).

The polymerization catalyst may further comprise at least one organoaluminum compound. The polymerization catalyst may further comprise at least one compound selected from a non-conjugated diene compound, a boron compound or an aluminum compound showing Lewis acidity, and an ionic boron compound.

In the process for producing a cyclic olefin addition copolymer of the present invention, an aromatic vinyl compound is preferably used as a molecular weight modifier. The polymerization catalyst preferably comprises an Ni compound, a superacid and/or Lewis acid, and methyl alumoxane.

A crosslinked product of the present invention is crosslinked by allowing the reactive silyl group in the cyclic olefin addition copolymer in the crosslinking composition to form a siloxane bond by hydrolysis and condensation.

A process for producing the crosslinked product of the present invention comprises casting a solution in which the crosslinking composition is dissolved, and crosslinking the cast product by heating at 50–200° C.

Another process for producing the crosslinked product of the present invention comprises crosslinking a film or a sheet obtained by casting a solution of a crosslinking composition including the cyclic olefin addition copolymer, a tin compound, and a compound which generates an acid by hydrolysis by heating in the presence of water or vapor at 50–200° C.

An optical material of the present invention comprises the cyclic olefin addition copolymer, the crosslinking composition, or the crosslinked product. The optical material of the present invention is preferably in the shape of a thin film, a film, or a sheet.

The present invention further provides applications of the optically transparent material such as a substrate film, a polarizing film, a surface protective film, a retardation film, a transparent conductive film, and an optical diffusion film used for a liquid crystal display device or an EL display device.

A transparent conductive composite material of the present invention comprises the optically transparent material and a transparent conductive film formed on the surface of the optically transparent material.

Other objects, features and advantages of the invention will hereinafter become more readily apparent from the following description.

DETAILED DESCRIPTION OF THE INVENTION AND PREFERRED EMBODIMENT

Figure 1:
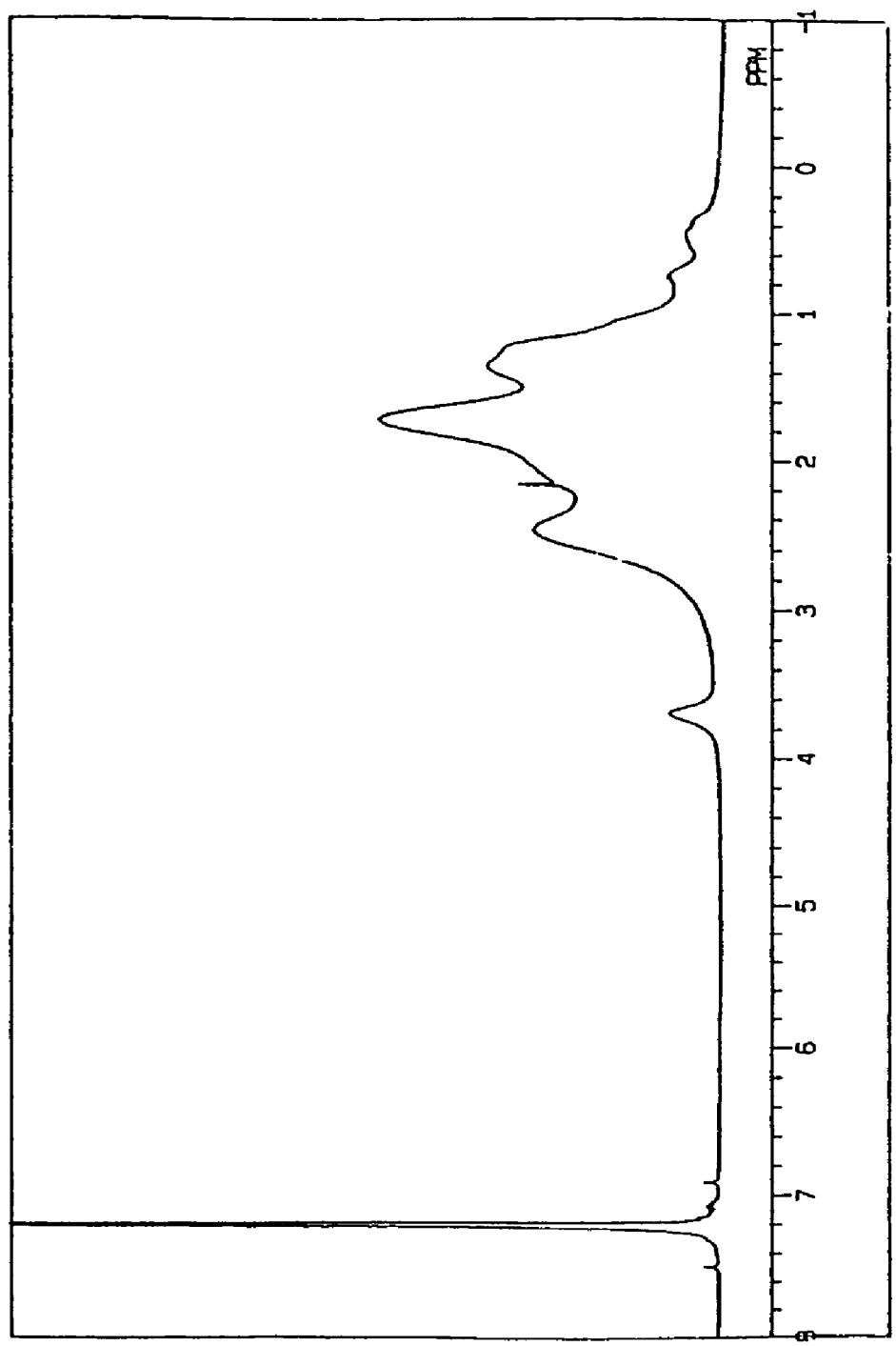
FIG. 1 shows a $^1$H-NMR chart of a copolymer A obtained in Example 1.

The present invention is described below in detail.

A cyclic olefin addition copolymer of the present invention comprises a repeating unit (a) shown by the following formula (1) and a repeating unit (b) shown by the following formula (4), and has a number average molecular weight of 10,000 to 1,000,000:

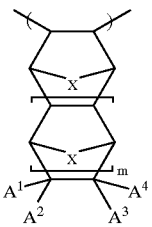 (1)

wherein $A^1$ to $A^4$ individually represent a hydrogen atom, a halogen atom, an alkyl group, alkenyl group, cycloalkyl group, or aryl group having 1–20 carbon atoms, or a reactive silyl group shown by the following formula (2) or (3), provided that at least one of $A^1$ to $A^4$ represents the reactive silyl group, X represents —CH$_2$— or —O—, and m is either 0 or 1;

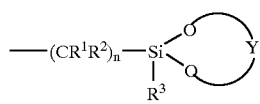 (2)

wherein $R^1$ to $R^3$ individually represent a hydrogen atom or a hydrocarbon group having 1–20 carbon atoms, n is an integer from 0 to 5, and Y represents a hydrocarbon residue of an aliphatic diol, an alicyclic diol, or an aromatic diol having 2–20 carbon atoms;

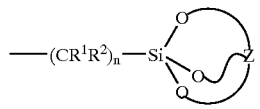 (3)

wherein $R^1$ and $R^2$ individually represent a hydrogen atom or a hydrocarbon group having 1–20 carbon atoms, n is an integer from 0 to 5, and Z represents a hydrocarbon residue of an aliphatic triol, an alicyclic triol, or an aromatic triol having 4–20 carbon atoms;

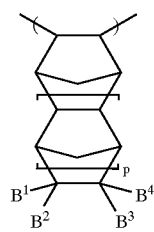 (4)

wherein $B^1$ to $B^4$ individually represent a hydrogen atom, a substituent selected from a halogen atom, an alkyl group, cycloalkyl group, aryl group, alkenyl group, halogenated hydrocarbon group, alkoxy group, and allyloxy group having 1–20 carbon atoms, or a polar group shown by —(CH$_2$)$_k$Y' (wherein Y' represents —C(O)OR$^4$ or —OC(O) R$^5$, R$^4$ and R$^5$ represent a substituent selected from an alkyl group, alkenyl group, cycloalkyl group, and aryl group having 1–20 carbon atoms, and halogen substituted groups of these, and k is an integer from 0 to 5), $B^1$ and $B^2$ or $B^3$ and $B^4$ may form an alkydenyl group, $B^1$ and $B^3$, $B^1$ and $B^4$, $B^2$ and $B^3$, or $B^2$ and $B^4$ may form a cycloalkylene group or a cycloalkenylene group, and p is an integer from 0 to 2.

The repeating unit (a) included in the cyclic olefin addition copolymer of the present invention is formed by addition polymerization of a cyclic olefin compound having a reactive silyl group shown by the formula (5) (hereinafter called "specific monomer (1)"):

 (5)

wherein $A^1$, $A^2$, $A^3$, $A^4$, X, and m are the same as defined for the formula (1).

As examples of the specific monomer (1), the following compounds can be given. However, the specific monomer (1) of the present invention is not limited to these examples.

As specific examples of the specific monomer (1) having the reactive silyl group shown by the formula (2), 5-[1'-methyl-2'5'-dioxa-1'-silacyclopentyl]-bicyclo[2.2.1]hept-2-ene, 5-[1'-methyl-3',3',4',4'-tetraphenyl-2',5'-dioxa-1'-silacyclopentyl]-bicyclo[2.2.1]hept-2-ene, 5-[1',3',3',4',4'-pentamethyl-2',5'-dioxa-1'-silacyclopentyl]-bicyclo[2.2.1]hept-2-ene, 5-[1'-phenyl-2',5'-dioxa-1'-silacyclopentyl]-bicyclo[2.2.1]hept-2-ene, 5-[1'-ethyl-2',5'-dioxa-1'-silacyclopentyl]-bicyclo[2.2.1]hept-2-ene, 5-[1',3'-dimethyl-2',5'-dioxa-1'-silacyclopentyl]-bicyclo[2.2.1]hept-2-ene, 5-[1',3',4'-trimethyl-2',5'-dioxa-1'-silacyclopentyl]-bicyclo[2.2.1]hept-2-ene, 5-[1'-methyl-2',6'-dioxa-1'-silacyclohexyl]-bicyclo[2.2.1]hept-2-ene, 5-[1'-ethyl-2',6'-dioxa-1'-silacyclohexyl]-bicyclo[2.2.1]hept-2-ene, 5-[1',3'-dimethyl-2',6'-dioxa-1'-silacyclohexyl]-bicyclo[2.2.1]hept-2-ene, 5-[1',4',4'-trimethyl-2',6'-dioxa-1'-silacyclohexyl]-bicyclo[2.2.1]hept-2-ene, 5-[1',4',4'-trimethyl-2',6'-dioxa-1'-silacyclohexyl]methyl-bicyclo[2.2.1]hept-2-ene, 5-[1',4',4'-trimethyl-2',6'-dioxa-1'-silacyclohexyl]ethyl-bicyclo[2.2.1]hept-2-ene, 5-[1'-phenyl-4',4'-dimethyl-2',6'-dioxa-1'-silacyclohexyl]-bicyclo[2.2.1]hept-2-ene, 5-[1'-methyl-4'-phenyl-2',6'-dioxa-1'-silacyclohexyl]-bicyclo[2.2.1]hept-2-ene, 5-[1'-methyl-4'-spiro-cyclohexyl-2',6'-dioxa-1'-silacyclohexyl]-bicyclo[2.2.1]hept-2-ene, 5-[1'-methyl-4'-ethyl-4'-butyl-2',6'-dioxa-1'-silacyclohexyl]-bicyclo[2.2.1]hept-2-ene, 5-[1',3',3'-trimethyl-5'-methylene-2',6'-dioxa-1'-silacyclohexyl]-bicyclo[2.2.1]hept-2-ene, 5-[1'-phenyl-2',6'-dioxa-1'-silacyclohexyl]-bicyclo[2.2.1]hept-2-ene,
5-[1'-methyl-3'-phenyl-2',6'-dioxa-1'-silacyclohexyl]-bicyclo[2.2.1]hept-2-ene,
5-[1',4',4'-trimethyl-2',6'-dioxa-1'-silacyclohexyl]-7-oxa-bicyclo[2.2.1]hept-2-ene,
5-[1'-methyl-2',6'-dioxa-1'-silacyclohexyl]-7-oxa-bicyclo[2.2.1]hept-2-ene,
5-[1'-methyl-2',7'-dioxa-1'-silacycloheptyl]-bicyclo[2.2.1]hept-2-ene,
8-[1',4',4'-trimethyl-2',6'-dioxa-1'-silacyclohexyl]tetracyclo[4.4.0.1$^{2,5}$.1$^{7,10}$]dodec-3-ene,
8-[1'-methyl-2',6'-dioxa-1'-silacyclohexyl] tetracyclo[4.4.0.1$^{2,5}$.1$^{7,10}$]dodec-3-ene, and the like can be given.

As specific examples of the specific monomer (1) having the reactive silyl group shown by the formula (3),
5-(2',6',7'-trioxa-1'-silabicyclo[2.2.2]octyl)-bicyclo[2.2.1]hept-2-ene,
5-(4'-methyl-2',6',7'-trioxa-1'-silabicyclo[2.2.2]octyl)-bicyclo[2.2.1]hept-2-ene,
5-(4'-ethyl-2',6',7'-trioxa-1'-silabicyclo[2.2.2]octyl)-bicyclo[2.2.1]hept-2-ene,
5-(4'-phenyl-2',6',7'-trioxa-1'-silabicyclo[2.2.2]octyl)-bicyclo[2.2.1]hept-2-ene,
5-(4'-cyclohexyl-2',6',7'-trioxa-1'-silabicyclo[2.2.2]octyl)-bicyclo[2.2.1]hept-2-ene, and the like can be given.

These compound are obtained by the Diels-Alder reaction of a cyclopentadiene with an olefin substituted by halogenated silane compound, and the reaction of the silyl compound with a diol compound or a triol compound (first method).

For example, 5-[1'-methyl-2',6'-dioxa-1'-silacyclohexyl]-bicyclo[2.2.1]hept-2-ene is obtained by reacting 5-methyldichlorosilyl-bicyclo[2.2.1]hept-2-ene obtained by the Diels-Alder reaction of a cyclopentadiene with methylvinyldichlorosilane, and the reaction of the product with 1,3-propanediol in the presence of a tertiary amine such as triethylamine.

The above compounds are also obtained by subjecting a compound obtained by reacting an olefin-terminated halogenated silane compound with a diol compound or a triol compound and cyclopentadiene to a Diels-Alder reaction (second method).

For example, 5-[1'-methyl-2',6'-dioxa-1'-silacyclohexyl]-bicyclo[2.2.1]hept-2-ene is obtained by subjecting 1-methyl-1-vinyl-2,6-dioxa-1-silacyclohexane obtained by reacting methylvinyldichlorosilane with 1,3-propanediol in the presence of a tertiary amine such as triethylamine and cyclopentadiene to a Diels-Alder reaction.

Of these specific monomers (1), use of the monomer having the reactive silyl group shown by the formula (2) is preferable because the resulting copolymer exhibits stability against an acid. Y in the reactive silyl group shown by the formula (2) is preferably an α,ω-diol residue having 2–4 carbon atoms. Specifically, the dioxa-silacycloalkyl structure in the reactive silyl group preferably forms a 5–7 membered ring from the viewpoint of the polymerization yield of the cyclic olefin addition copolymer of the present invention. Y in the reactive silyl group is particularly preferably a residue of propanediol, which is a diol having three carbon atoms or substituted propanediol. Specifically, the dioxa-silacycloalkyl structure in the reactive silyl group particularly preferably forms a six-membered ring.

The specific monomers (1) may be used either individually or in combination of two or more.

The content of the repeating unit (a) having the reactive silyl group in the cyclic olefin addition polymer of the present invention is preferably 0.5–30 mol %. If the content of the repeating unit (a) having the reactive silyl group is less than 0.5 mol %, crosslinking density when crosslinking the copolymer is small, whereby improvement of solvent resistance, chemical resistance, and dimensional stability may be insufficient. If the content exceeds 30 mol %, the resulting copolymer may be clouded or storage stability of the resulting composition may be decreased.

The repeating unit (a) may be present randomly in the cyclic olefin addition copolymer, or distributed in the shape of a block or a taper.

The repeating unit (b) shown by the formula (4) included in the cyclic olefin addition copolymer of the present invention is formed by addition polymerization of a cyclic olefin compound shown by the following formula (6) (hereinafter called "specific monomer (2)").

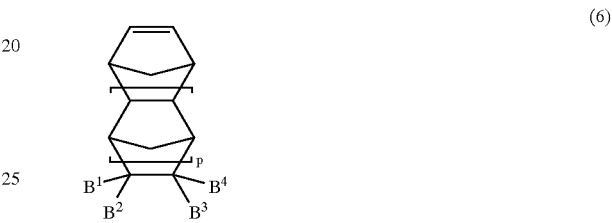

(6)

wherein $B^1$, $B^2$, $B^3$, $B^4$, and p are the same as defined for the formula (4).

As examples of the specific monomer (2), bicyclo[2.2.1]hept-2-ene, 5-methyl-bicyclo[2.2.1]hept-2-ene,
5-ethyl-bicyclo[2.2.1]hept-2-ene,
5-propyl-bicyclo[2.2.1]hept-2-ene,
5-butyl-bicyclo[2.2.1]hept-2-ene,
5-pentyl-bicyclo[2.2.1]hept-2-ene,
5-hexyl-bicyclo[2.2.1]hept-2-ene,
5-heptyl-bicyclo[2.2.1]hept-2-ene,
5-octyl-bicyclo[2.2.1]hept-2-ene,
5-decyl-bicyclo[2.2.1]hept-2-ene,
5-dodecyl-bicyclo[2.2.1]hept-2-ene,
5,6-dimethyl-bicyclo[2.2.1]hept-2-ene,
5-methyl,5-ethyl-bicyclo[2.2.1]hept-2-ene,
5-phenyl-bicyclo[2.2.1]hept-2-ene,
5-vinyl-bicyclo[2.2.1]hept-2-ene,
5-allyl-bicyclo[2.2.1]hept-2-ene,
5-isopropylidene-bicyclo[2.2.1]hept-2-ene,
5-ethylidene-bicyclo[2.2.1]hept-2-ene,
5-cyclohexyl-bicyclo[2.2.1]hept-2-ene,
5-fluoro-bicyclo[2.2.1]hept-2-ene,
5-trifluoromethyl-5,6,6-trifluoro-bicyclo[2.2.1]hept-2-ene,
5-chloro-bicyclo[2.2.1]hept-2-ene,
bicyclo[2.2.1]hept-5-ene-2-methyl carboxylate,
bicyclo[2.2.1]hept-5-ene-2-ethyl carboxylate,
bicyclo[2.2.1]hept-5-ene-2-butyl carboxylate,
2-methyl-bicyclo[2.2.1]hept-5-ene-2-methyl carboxylate,
2-methyl-bicyclo[2.2.1]hept-5-ene-2-ethyl carboxylate,
2-methyl-bicyclo[2.2.1]hept-5-ene-2-propyl carboxylate,
2-methyl-bicyclo[2.2.1]hept-5-ene-2-butyl carboxylate,
2-methyl-bicyclo[2.2.1]hept-5-ene-2-trifluoroethyl carboxylate,
2-methyl-bicyclo[2.2.1]hept-2-enyl ethyl acetate,
2-methyl-bicyclo[2.2.1]hept-5-enyl acrylate,
2-methyl-bicyclo[2.2.1]hept-5-enyl methacrylate,
bicyclo[2.2.1]hept-5-ene-2,3-dimethyl dicarboxylate,
bicyclo[2.2.1]hept-5-ene-2,3-diethyl dicarboxylate, tricyclo[5.2.1.0²,⁶]dec-3-ene,
tricyclo[5.2.1.0²,⁶]deca-3,7-diene,
tetracyclo[4.4.0.1²,⁵.1⁷,¹⁰]dodec-3-ene,
8-methyl-3-tetracyclo[4.4.0.1²,⁵1⁷,¹⁰]dodec-3-ene,
8-methyl-8-carboxymethyl,3-tetracyclo[4.4.0.1²,⁵1⁷,¹⁰] dodec-3-ene,
8-methyl-8-carboxyethyl,3-tetracyclo[4.4.0.1²,⁵1⁷,¹⁰]dodec-3-ene, and the like can be given. However, the specific monomer (2) of the present invention is not limited to these examples.

The specific monomers (2) may be used either individually or in combination of two or more.

The repeating unit (b) preferably does not include an unsaturated group in the structure from the viewpoint of heat resistance and oxidation deterioration resistance. In the case of a copolymer having a carbon-carbon double bond in the side chain which is obtained by addition polymerization of tricyclo[5.2.1.0²,⁶]deca-3,7-diene,
5-vinyl-bicyclo[2.2.1]hept-2-ene,
5-allyl-bicyclo[2.2.1]hept-2-ene,
5-ethylidene-bicyclo[2.2.1]hept-2-ene, or the like, it is preferable to further hydrogenate the double bond, since heat resistance and oxidation deterioration resistance can be improved.

If the repeating unit (b) does not contain a polar group such as an ester group or an acid anhydride group, the resulting copolymer exhibits low water absorption and a low dielectric constant. However, since adhesion or miscibility with other materials tends to be decreased, it is preferable to appropriately select the repeating unit (b) depending upon the purpose of use.

The repeating unit (b) of the present invention is a 2,3-addition structural unit when p in the formula (4) is one. However, a 2,7-addition structural unit may be included.

The repeating unit (b) is a 3,4-addition structural unit when p is two. However, a 3,11-addition structural unit or a 3,12-addition structural unit may be included.

The content of the repeating unit (b) in the cyclic olefin addition copolymer of the present invention is usually 60–99.5 mol %, preferably 80–99 mol %, and still more preferably 85–98 mol %. If the content of the repeating unit (b) is less than 60 mol %, heat resistance may be insufficient. If the content exceeds 99.5 mol %, birefringence and adhesion may be insufficient.

The cyclic olefin addition copolymer of the present invention may further comprise a structural unit (c) shown by the following formula (7):

—CH₂—CH(R⁶)— (7)

wherein R⁶ represents a hydrogen atom, or a substituent selected from an alkyl group, phenyl group, alkyl substituted phenyl group, and trialkyl substituted silyl group.

The structural unit (c) shown by the formula (7) may be formed by addition copolymerization of an α-olefin shown by the following formula (8) (hereinafter called "specific α-olefin"):

CH₂=CH(R⁶) (8)

wherein R⁶ is the same as defined for the formula (7).

As specific examples of the specific α-olefin, ethylene, propylene, 1-butene, 1-hexene, 1-octene, trimethylsilylethylene, triethylsilylethylene, styrene, 4-methylstyrene, 2-methylstyrene, 4-ethylstyrene, and the like can be given.

These specific α-olefins may be used either individually or in combination of two or more.

The content of the structural unit (c) in the cyclic olefin addition copolymer of the present invention is 0–40 mol %, and preferably 0–20mol % (repeatingunits (a)+(b)+(c)=100 mol %). If the content of the structural unit (c) exceeds 40 mol %, the glass transition temperature of the cyclic olefin addition copolymer of the present invention may be decreased, whereby heat resistance may be insufficient.

The polystyrene-reduced number average molecular weight (Mn) and weight average molecular weight (Mw) of the cyclic olefin addition copolymer of the present invention measured by gel permeation chromatography using o-dichlorobenzene as a solvent are respectively 10,000–1,000,000 and 20,000–1,500,000, and preferably 20,000–500,000 and 40,000–1,000,000. The number average molecular weight and the weight average molecular weight are particularly preferably 50,000–200,000 and 100,000–700,000, respectively.

If the number average molecular weight and the weight average molecular weight are less than 10,000 and 20,000, respectively, breaking strength and elongation of the resulting film, thin film, or sheet may be insufficient, whereby cracks tend to occur. If the number average molecular weight and the weight average molecular weight exceed 1,000,000 and 1,500,000, respectively, formability of a sheet or a film may be decreased, or viscosity of the solution may be increased when forming a cast film, whereby handling of the solution becomes difficult due to insufficient storage stability.

Since the cyclic olefin addition copolymer of the present invention is formed by using the specific monomer (1), the cyclic olefin addition copolymer has a molecular weight distribution wider than that of a conventional cyclic olefin compound having a reactive silyl group (WO97/20871, WO98/20394, etc.). Therefore, a cyclic olefin addition copolymer having a ratio of the Mw to the Mn (Mw/Mn) of 2.5–7.0 is comparatively easily obtained.

Because of this, the cyclic olefin addition copolymer of the present invention exhibits no (or only a small degree of) fragility, occurrence of cracks, and the like when used as a film, a sheet, or a thin film such as a coating film.

The glass transition temperature of the cyclic olefin addition copolymer of the present invention is determined by a peak temperature of the temperature variance of Tan δ measured by dynamic viscoelasticity (storage modulus of elasticity: E', loss modulus of elasticity: E", Tan δ=E"/E').

The glass transition temperature of the cyclic olefin addition copolymer of the present invention measured as described above is usually 200–400° C., and preferably 250–380° C.

If the glass transition temperature is less than 200° C., a problem relating to thermal deformation may occur when processing or using a formed product including the cyclic olefin addition copolymer of the present invention. If the glass transition temperature exceeds 400° C., the processing temperature may be excessively increased during thermal processing such as heat sealing, whereby a formed product including the cyclic olefin addition copolymer of the present invention may deteriorate due to heat.

The cyclic olefin addition copolymer of the present invention is produced by addition polymerization of the specific monomer (1), the specific monomer (2), and, optionally, the specific α-olefin. A process for producing the cyclic olefin addition copolymer is described below.

As a polymerization catalyst, (A) a multicomponent catalyst or (B) a single complex catalyst given below is used. However, the present invention is not limited to these examples.

The multicomponent catalyst (A) includes a component 1), a component 2), and, optionally, a component 3) given below.

1) Transition Metal Compound: at Least One Compound Selected from the Group Consisting of the Following Compounds A compound selected from an organic carboxylate, organic phosphite, organic phosphate, organic sulfonate, and β-diketone compound of nickel, cobalt, or palladium. As examples of such a compound, nickel acetate, nickel octanoate, nickel 2-ethylhexanoate, nickel naphthenate, nickel oleate, nickel stearate, nickel dibutylphosphite, nickel dibutylphosphate, nickel dioctylphosphate, nickel salt of dibutylphosphate, nickel dodecylbenzenesulfonate, nickel p-toluenesulfonate, nickel bis(acetylacetonate), nickel bis(acetylacetate), cobalt (II) 2-ethylhexanoate, cobalt (III) 2-ethylhexanoate, cobalt (II) dodecanoate, cobalt (II) naphthenate, cobalt (II) versatate, cobalt (III) tris(acetylacetonate), palladium acetate, palladium 2-ethylhexanoate, palladium bis(acetylacetonate), and the like can be given.

A superacid modified compound produced from the above organic carboxylate of nickel, cobalt, or palladium and hexafluoroantimonic acid, tetrafluoroboric acid, trifluoroacetic acid, or hexafluoroacetone.

A complex in which a diene or triene compound is coordinated to nickel such as a 1,5-cyclooctadiene complex of nickel, [(η$^3$-crotyl)Ni(cyclooctadiene)][B((CF$_3$)$^2$C$_6$H$_4$)$_4$], [cyclododecatriene]nickel, and bis[norbornadiene]nickel.

A complex in which a ligand having P, N, O, or the like is coordinated to nickel such as bis (triphenylphosphine) nickel dichloride, bis(triphenylphosphine)nickel dibromide, bis(triphenylphosphine)cobalt dibromide, bis(tris-tolylphosphine)nickel dichloride, bis[N-(3-tert-butylsalicylidene)phenylaminato]Ni, Ni[PhC(O)CHPPh$_2$](Ph)(PPh$_3$), Ni(OC(O)(C$_6$H$_4$)PPh$_2$)(H)(PCy$_3$), Ni[OC(O)(C$_6$H$_4$)PPh$_2$](H)(PPh$_3$), a reaction product of Ni(COD)$_2$ and PPh$_3$=CHC(O)Ph, and [(ArN=CHC$_6$H$_3$(O)(Anth)](Ph)(PPh$_3$)Ni (wherein Ar: 2,6-(Pr)$_2$C$_6$H$_3$, Pr: isopropyl, Anth: 9-anthracene, Ph: phenyl, Cy: Cyclohexyl, COD: 1,5-cyclooctadien).

2) Organoaluminum Compound

At least one compound selected from organoaluminum compounds such as methyl alumoxane, ethyl alumoxane, butyl alumoxane, methyl alumoxane in which trialkylaluminum is partially mixed, trimethylaluminum, triethylaluminum, triisobutyl aluminum, diisobutylaluminum hydride, diethylaluminum chloride, ethylaluminum sesquichloride, and ethylaluminum dichloride. Of these, an organoaluminum compound containing at least methyl alumoxane is preferable.

3) Compound Added to Improve Polymerization Activity

A non-conjugated diene compound such as 1,5-cyclooctadiene and 1,5,9-cyclododecatriene. A boron compound or aluminum compound showing Lewis acidity such as a complex of boron trifluoride with an ether, amine, phenol, or the like, a complex of aluminum trifluoride with an ether, amine, phenol, or the like, tri(pentafluorophenyl)borane, tri(3,5-di-trifluoromethylphenyl)borane, and tri(pentafluorophenyl)aluminum. At least one compound selected from ionic boron compounds such as triphenylcarbenium tetrakis(pentafluorophenyl)borate, triphenylcarbenium tetrakis(3,5-di-trifluoromethylphenyl)borate, tributylammonium tetrakis(pentafluorophenyl)borate, N,N-dimethylanilinium tetrakis(pentafluorophenyl)borate, and N,N-diethylanilinium tetrakis(pentafluorophenyl)borate.

As examples of the single component catalyst (B), the following compounds can be given.

B-1) Compound Shown by the Following Formula (9)

$$[L^1L^2ML^3]^+[A]^- \qquad (9)$$

wherein M represents Ni, Co, or Pd, L$^1$, L$^2$, and L$^3$ represent a ligand of M, provided that only one ligand has a σ bond and all the ligands have 1–3 π bonds in total, and A represents a counter anion. L$^1$, L$^2$, and L$^3$ represent a compound selected from a cyclodiene having 6–20 carbon atoms, norbornadiene, a cyclotriene having 10–20 carbon atoms, and an aromatic compound having 6–20 carbon atoms. The counter anion A is preferably BF$_4^-$, PF$_6^-$, SbF$_5$SO$_3$F$^-$, AlF$_3$SO$_3$CF$_3^-$, AsF$_6^-$, SbF$_6^-$, AsF6$^-$, CF$_3$CO$_2^-$, C$_2$F$_5$CO$_2^-$, CH$_3$C$_6$H$_4$SO$_3^-$, B[C$_6$F$_5$]$_4^-$, or B[C$_6$H$_3$(CF$_3$)$_2$]$_4^-$.

B-2) Arene Complex of Ni(C$_6$F$_5$)$_2$ or Ni(SiCl$_3$)$_2$

B-3) Palladium Complex Shown by [Pd(II)(L$^4$)$_4$][A]$_2$ wherein A is the same as defined in B-1, and L$^4$ represents a nitrile compound, a tertiary amine compound, or a triarylphosphine compound.

As specific examples of these compounds, the following compounds can be given.

B-1)
[(η$^3$-crotyl)Ni(cycloocta-1,5-diene)][B((CF$_3$)$_2$C$_6$H$_4$)$_4$],
[(η$^3$-crotyl)Ni(cycloocta-1,5-diene)][PF$_6$],
(PPh$_3$)(C$_6$H$_5$)Ni(Ph$_2$PCH=C(O)Ph),
[(6-methoxy-bicyclo[2.2.1]hept-2-ene-end-5σ,2π)Pd(cycloocta-1,5-diene)][PF$_6$],
[(6-methoxy-bicyclo[2.2.1]hept-2-ene-end-5σ,2π)Pd(cycloocta-1,5-diene)][SbF$_6$],
[(η$^3$-ally)Pd][SbF6] obtained from [(η$^3$-ally)PdCl]$_2$ and AgSbF$_6$,
[(η$^3$-ally)Pd][BF$_4$] obtained from [(η$^3$-ally)PdCl]$_2$ and AgBF$_4$,
[(η$^3$-crotyl)Pd(cycloocta-1,5-dien)][PF$_6$],
[Ph$_3$PPdCH$_3$][B(CF$_3$)$_2$C$_6$H$_4$)$_3$], and
[(clcloocta-1,5-diene)Pd(CH$_3$)Cl][B((CF$_3$)$_2$C$_6$H$_4$)$_3$]

B-2)
Toluene.Ni(C$_6$F$_5$)$_2$, xylene.Ni(C$_6$F$_5$)$_2$, mesitylene.Ni(C$_6$F$_5$)$_2$, and toluene.Ni(SiCl$_3$)$_2$ B-3)
[Pd(CH$_3$CN)$_4$][BF$_4$]$_2$, [Pd(C$_6$H$_5$CN)$_4$][BF$_4$]$_2$, [Pd(C$_6$H$_5$CN)$_4$][SbF$_6$]$_2$, [Pd((C$_6$H$_5$)$_3$P)$_2$][SbF$_6$]$_2$,
[(6-methoxy-bicyclo[2.2.1]hept-2-ene-end-5σ,2π)Pd(cycloocta-1,5-diene)][PF$_6$],
[(6-methoxy-bicyclo[2.2.1]hept-2-ene-end- 5σ,2π)Pd(cycloocta-1,5-diene)][SbF$_6$],
[(η$^3$-ally)Pd][SbF$_6$] obtained from [(η$^3$-ally)PdCl]$_2$ and AgSbF$_6$,
[(η$^3$-ally)Pd][BF$_4$] obtained from [(η$^3$-ally)PdCl]$_2$ and AgBF$_4$,
[(η$^3$-crotyl)Pd(cycloocta-1,5-dien)][PF$_6$], and
[Ph$_3$PdCH$_3$][B((CF$_3$)$_2$C$_6$H$_4$)$_4$]

The multicomponent catalyst is used in an amount given below.

The transition metal compound such as a nickel compound, cobalt compound, and palladium compound is used in an amount of 0.02–100 mmol atom for one mol of the monomers. The organoaluminum compound is used in an amount of 1–5,000 mol for one mol atom of the transition metal compound. The non-conjugated diene, Lewis acid, or ionic boron compound is used in an amount of 0.2–100 mol for one mol atom of nickel or cobalt.

The single component catalyst is used in an amount of 0.02–100 mmol atom for one mol of the monomers.

The cyclic olefin addition copolymer of the present invention is obtained by copolymerizing the monomers using the multicomponent catalyst consisting of the components selected from the above component 1), component 2), and, optionally, component 3), or the the single component catalyst in an alicyclic hydrocarbon solvent such as cyclohexane, cyclopentane, and methylcyclopentane, an aliphatic hydrocarbon solvent such as hexane, heptane, and octane, an aromatic hydrocarbon solvent such as toluene, benzene, xylene, and mesitylene, and a halogenated hydrocarbon solvent such as dichloromethane, 1,2-dichloroethylene, 1,1-dichloroethylene, tetrachloroethylene, chlorobenzene, and dichlorobenzene.

As the polymerization method, a reaction vessel is charged with a solvent, cyclic olefin monomers, and, optionally, a molecular weight modifier in a nitrogen or argon atmosphere. The polymerization system is set at −20° C. to 100° C.

After the addition of the above catalyst component, the monomers are polymerized at −20° C. to 100° C.

The weight ratio of the solvent to the monomers is 1–20. The molecular weight is adjusted to a target value by controlling the amount of the polymerization catalyst, the amount of the molecular weight modifier such as an α-olefin, hydrogen, aromatic vinyl compound, cyclooctadiene, or diphenyldihydrosilane, a conversion rate to the polymer, and the polymerization temperature. As the molecular weight modifier, an aromatic vinyl compound such as styrene, 3-methylstyrene, 4-methylstyrene, 4-ethylstyrene, 3,5-dimethylstyrene, 1-vinylnaphthalene, and divinylbenzene is preferably used.

The polymerization is terminated by the addition of a compound selected from water, an alcohol, an organic acid, carbon dioxide, and the like. A catalyst residue is removed from the polymer solution by adding a water/alcohol mixture of an acid selected from lactic acid, malic acid, maleic acid, fumaric acid, and oxalic acid.

The catalyst residue may be removed by using an adsorbent such as diatomaceous earth, alumina, silica, or activated carbon, or filtration using a filter or the like.

The polymer is obtained by placing the polymer solution in an alcohol such as methanol, ethanol, or isopropanol to coagulate the polymer, and drying the resulting polymer under reduced pressure. Unreacted monomers remaining in the polymer solution are also removed by this step.

The structure of the cyclic olefin addition copolymer having the reactive silyl group of the present invention may be confirmed by the nuclear magnetic resonance spectrum ($^1$H-NMR) from absorption by $CH_2$ in Si—O—$CH_2$— at 3.6–3.8 ppm, absorption originating in an alicyclic hydrocarbon at 0.6–3.0 ppm, and absorption by Si—$CH_2$ or Si—$CH_3$— of Si-alkyl at 0.2–0.6 ppm. The structure of the cyclic olefin addition copolymer may be confirmed by the infrared absorption spectrum from absorption of deformation vibration of a C—H bond of an alicyclic hydrocarbon which appears at near 1,450 $cm^{-1}$ and absorption of deformation vibration of an Si—O bond which appears at near 1,100 $cm^{-1}$. In the case where an ester group is included in the cyclic olefin addition copolymer having the reactive silyl group of the present invention, the structure of the cyclic olefin addition copolymer is confirmed from absorption of stretching vibration of a C=O bond which appears at 1,700 to 1,750 $cm^{-1}$ in the infrared absorption spectrum.

The content of the repeating unit originating from the specific monomer (1) in the copolymer is determined from the ratio of absorption by a proton of Si—O—$CH_2$— at 3.6–3.8 ppm to absorption by a proton of an alicyclic hydrocarbon at 0.6–3.0 ppm by $^1$H-NMR.

Addition of a conventional norbornene ring-opening (co)polymer, a hydrogenated product of the (co)polymer, and an addition copolymer of a norbornene monomer and ethylene (for example, Japanese Patent Application Laid-open No. 61-29260, Japanese Patent Application Laid-open No. 60-16870, Japanese Patent Application Laid-open No. 60-26024, Japanese Patent Application Laid-open No.2-51511, Japanese Patent Application Laid-open No. 1-132625, Japanese Patent Application Laid-open No. 1-132626, Japanese Patent Application Laid-open No. 4-202404, Japanese Patent Application Laid-open No. 4-63807, Japanese Patent Application Laid-open No. 8-198919, Published Japanese translation of PCT International Patent Application No. 9-508649, Published Japanese translation of PCT International Patent Application No. 11-505880, and Japanese Patent Application Laid-open No. 61-292601) to the cyclic olefin addition copolymer of the present invention decreases melt viscosity and improves formability during injection molding without impairing heat resistance, optical characteristics (transparency, low birefringence, and the like), and adhesion.

The cyclic olefin addition copolymer of the present invention may be used as a heat-curable transparent resin composition by adding an alicyclic epoxy compound and using a polyfunctional organic acid, acid anhydride, or the like as an auxiliary agent.

The ratio of the cyclic olefin addition copolymer of the present invention to other polymers or low-molecular-weight compounds used in such a composition is appropriately selected depending upon the types of the polymer of the present invention and other polymers, miscibility of these polymers, and purpose of the composition. The content of the cyclic olefin addition copolymer of the present invention in the composition is 5–95 wt %, preferably 10–90 wt %, and still more preferably 20–80 wt % in order to obtain a polymer composition excelling in heat resistance.

A conventional antioxidant such as a phenol-type or hydroquinone-type antioxidant such as
2,6-di-t-butyl-4-methylphenol,
4,4'-thiobis-(6-t-butyl-3-methylphenol),
1,1'-bis(4-hydroxyphenyl)cyclohexane,
2,2'-methylenebis(4-ethyl-6-t-butylphenol),
2,5-di-t-butylhydroquinone, and
pentaerythrityl-tetrakis[3-(3,5-di-t-butyl-4-hydroxyphenyl)] propionate may be added to the cyclic olefin addition copolymer of the present invention.

Oxidation stability may be improved by adding a phosphorus-type antioxidant such as bis[2-t-butyl-4-(2'-octadecanyloxycarbonyl)ethyl-6-methyl-phenyl]phosphite, tris(4-methoxy-3,5-diphenyl)phosphite, tris(nonylphenyl)phosphite, tris(2,4-di-t-butylphenyl)phosphite, bis(2,6-di-t-butyl-4-methyl-phenyl)pentaerythritol diphosphite, and bis(2,4-di-t-butylphenyl)pentaerythritol diphosphite.

Of these compounds, a compound having a decomposition temperature (5% weight decrease) of 250° C. or more is preferable.

These antioxidants are added in an amount of 0.05–5.0 parts by weight for 100 parts by weight of the cyclic olefin addition copolymer.

Since the cyclic olefin addition copolymer of the present invention includes the reactive silyl group having a specific structure, the cyclic olefin addition copolymer can be crosslinked at a comparatively low temperature of 50–200° C. for a short period of time by preparing a composition prepared by combining the cyclic olefin addition copolymer with 1) a metal compound, 2) an inorganic acid or an organic acid, 3) a compound which functions as an acid by heating at 50° C. or more, and 4) a compound which functions as an acid by heating at 50° C. or more in the presence of water or vapor. Therefore, the resulting crosslinked product is not substantially affected by oxidation deterioration due to heat and maintains excellent optical characteristics of the cyclic olefin addition copolymer. Moreover, the crosslinked product has improved heat resistance and excels in dimensional stability, solvent resistance, and chemical resistance. The reactive silyl group having a specific structure in the copolymer not only contributes to crosslinking of the cyclic olefin addition copolymer, but also increases adhesion and miscibility with other materials. In addition, since the reactive silyl group in the cyclic olefin addition copolymer of the present invention has a specific structure, a composition prepared by combining the cyclic olefin addition copolymer with the above compounds 1) to 4) has storage stability, handling capability, and crosslinking activity in good balance.

A crosslinking composition including the cyclic olefin addition copolymer of the present invention is described below in detail.

1) Metal Compound

As examples of the metal compound which can be used in the composition of the present invention, metal compounds such as an alkoxy compound, allyloxy compound, thiol compound, β-diketone salt, organic carboxylate, oxide, and halide of a metal such as Al, Mg, Ga, Zn, Ba, Ca, Sb, Si, Sn, Ce, Ti, Zr, V, Y, Sm, Nd, Yb, and Sc can be given.

As specific examples of these compounds, aluminum compounds such as triisopropoxyaluminum, diethylaluminum methoxide, diethylaluminum allyloxide, diisobutylaluminum methoxide, and aluminum diisopropoxyethyl acetate, magnesium compounds such as diisopropoxymagnesium and dibutoxymagnesium, zinc compounds such as zinc acetate and zinc acetylacetonate, calcium compounds such as calcium acetate, gallium compounds such as gallium triisopropoxide and gallium tributoxide, barium compounds such as barium diisopropoxide and barium nonylphenolate, tin compounds such as dibutyltin dilaurate, dioctyltin dilaurate, dibutyltin dioleate, dibutyltin distearate, dibutyltin maleate, dioctyltin fumarate, tin octanoate, tin decanoate, and tin oleate, titanium compounds such as titanium triisopropoxide, titanium tetrabutoxide, and titanium bis (ethylene glycoxide), vanadium compounds such as vanadium tetrabutoxide and vanadyl triethoxide, antimony compounds such as antimony glycoxide, antimony triacetate, and antimony trioxide, scandium compounds such as scandium triisopropoxide and scandium trioxide, cerium compounds such as cerium triisopropoxide and cerium trichloride, lanthanide compounds such as neodium triisopropoxide, neodium oxo.isopropoxide, samarium triisopropoxide, yttrium triisopropoxide, yttrium oxo.isopropoxide, and yttrium tris [tetraisopropoxyaluminum], and the like can be given. Of these, an organic carboxylate of Sn is effective as the crosslinking catalyst by addition of only a small amount.

2) Inorganic Acid and Organic Acid

Hydrochloric acid, sulfuric acid, hydrofluoric acid, tetrafluoroboric acid, phosphorous acid, an organic carboxylic acid, an organic sulfonic acid, an organic sulfinic acid, an organic phosphoric acid, and the like can be given.

3) Compound Which Functions as Acid by Heating at 50° C. or More

An aromatic sulfonium salt, an aromatic ammonium salt, an aromatic pyridinium salt, an aromatic phosphonium salt, an aromatic iodonium salt, a hydrazinium salt, and iron salt of metallocene, for which a counter anion is selected from $BF_4$, $PF_4$, $AsF_6$, $SbF_6$, and $B(C_6F_5)_4$, and the like, can be given.

4) Compound Which Functions as Acid by Heating at 50° C. or More in the Presence of Water or Vapor A trialkylphosphite, a triarylphosphite, a dialkylphosphite, a monoalkylphosphite, a hypophosphite, an ester of an organic carboxylic acid and a secondary or tertiary alcohol, a hemiacetal ester of an organic carboxylic acid, a trialkylsilyl ester of an organic carboxylic acid, and the like can be given.

The compounds 1) to 4) may be used either individually or in combination of two or more. The term "in combination of two or more" used herein refers to the case of using the compounds 1) in combination of two or more, or the case of using the compound 1) and the compound 2) in combination.

Among the compounds 1) to 4), the compound 4) is preferable from the viewpoint of a balance between storage stability and handling of the composition and crosslinking activity. In particular, use of a triester compound of phosphorous acid is preferable.

In the case where the composition of the present invention includes a polyfunctional alkoxy compound of a specific metal described later or a condensation product of a polyfunctional alkoxy compound of a specific metal and/or specific metal oxide particles, use of the compound 1), in particular, an organic carboxylate of Sn in combination with the compound 4) enables provision of a crosslinked structure which is optically transparent and effective for improving dimensional stability, solvent resistance, and chemical resistance.

The compounds 1) to 4) which are used as a crosslinking catalyst is used in an amount of 0.0001–5.0 parts by weight for 100 parts by weight of the cyclic olefin addition copolymer of the present invention.

The crosslinking reaction by the formation of a siloxane bond caused by hydrolysis and condensation of the reactive silyl group in the cyclic olefin addition copolymer of the present invention is carried out at 50–200° C. to obtain a crosslinked product.

In addition to the cyclic olefin addition copolymer of the present invention and at least one compound selected from the compounds 1) to 4), the composition of the present invention may further comprise at least one compound selected from polyfunctional alkoxy compounds of Si, Al, Ti, and Zr, specifically, tetraalkoxy compounds, trialkoxy compounds, dialkoxy compounds, and the condensation product of polyfunctional alkoxy compounds of these metals (degree of condensation: 3–30).

Addition of such a compound enables a crosslinked product having a structure effective for improving dimensional stability, solvent resistance, and chemical resistance to be obtained.

As examples of the polyfunctional alkoxy compounds of Si, Al, Ti, and Zr which can be used in the present invention, an alcoholic salt and an aryl salt of Si, Al, Ti, and Zr such as tetramethoxysilane, tetraethoxysilane, methyltrimethoxysilane, methyltriethoxysilane, dimethyldimethoxysilane, cyclohexyltrimethoxysilane, methylcyclohexyldimethoxysilane, trimethoxyaluminum, triethoxyaluminum, tetraethoxytitanium, tetraethoxyzirconium, and the like can be given. A condensation product of the above compound (degree of condensation: 3–30) may also be used. These compounds may be used either individually or in combination of two or more.

The polyfunctional alkoxy compounds of Si, Al, Ti, and Zr or the condensation product of the polyfunctional alkoxy compounds of these metals (degree of condensation: 3–30) are used in an amount of 5–60 parts by weight for 100 parts by weight of the cyclic olefin addition copolymer.

In addition to the cyclic olefin addition copolymer of the present invention and at least one compound selected from the compounds 1) to 4), the composition of the present invention may further comprise at least one metal oxide selected from silica, alumina, zirconia, titanium dioxide, diatomite, montmorillonite, and tin oxide. The average particle diameter of the metal oxide is 200 nm or less, and preferably 100 nm or less. If the average particle diameter exceeds 200 nm, optical transparency may be impaired.

Since such a metal oxide bonds to the reactive silyl group in the cyclic olefin addition copolymer of the present invention to form a crosslinked structure, a crosslinked structure effective for improving dimensional stability, solvent resistance, and chemical resistance can be easily obtained.

The metal oxide is added in an amount of 1–40 parts by weight for 100 parts by weight of the cyclic olefin addition copolymer of the present invention. If the amount is less than 1 part by weight, improvement of hardness, the modulus of elasticity, and the coefficient of linear expansion of the resulting crossl inked product may be insufficient. If the amount exceeds 40 parts by weight, the resulting crosslinked product may be fragile.

The cyclic olefin addition copolymer of the present invention may be formed into a film or a sheet by using a melt extrusion method using a melt extruder or the like. The cyclic olefin addition copolymer may be formed into a film or a sheet by using a solution casting method which includes dissolving the copolymer in a solvent selected from polar solvents such as a hydrocarbon solvent, halogenated hydrocarbon solvent, ketone, ether, ester, amine, amide, and urea, casting the solution on a steel belt, carrier film, or the like, and drying the cast product to obtain a formed product. The cyclic olefin addition copolymer may be formed into a film or a sheet by swelling the copolymer in the above solvent, and forming the copolymer into a film or a sheet using an extruder while evaporating the solvent.

Since the cyclic olefin addition copolymer and the composition of the present invention have the reactive silyl group, the copolymer and the composition excel in adhesion to other materials. Therefore, the copolymer and the composition are useful as a coating material or an adhesive containing the copolymer.

In order to improve dimensional stability, solvent resistance, and chemical resistance, it is preferable to form the composition of the present invention into a film, a sheet, or a coating film and crosslink the copolymer by heating at 50–200° C., optionally in the presence of water or vapor, to obtain a crosslinked product.

Since the cyclic olefin addition copolymer of the present invention has the specific reactive silyl group, an increase in viscosity of the solution rarely occurs even if the copolymer is stored in a state in which only a small amount of water is present at 50° C. or less.

A film or a sheet with a uniform thickness is stably obtained by adding a crosslinking agent to the copolymer solution, forming the copolymer solution into a film or a sheet, and crosslinking the copolymer. Therefore, a product having a uniform surface showing no warping or winding can be obtained.

An optically transparent material such as a film obtained by using a transparent resin formed of the cyclic olefin copolymer composition of the present invention may be used as a film for display devices such as a liquid crystal display device or an EL display device.

The thickness of the film for display devices of the present invention is usually 5–600 $\mu$m, preferably 10–500 $\mu$m, and still more preferably 25–400 $\mu$m, which is appropriately determined depending upon the application. The film for display devices of the present invention preferably has a small variation in retardation. The variation in retardation of the film at a wavelength of 633 nm is preferably ±20% or less. If the variation in retardation exceeds ±20%, such a film is not optically uniform. If this film is used for a display device, it is difficult to obtain good display performance due to distortion of the image of the display and the like.

A liquid crystal substrate film of the present invention is obtained by using the above film for display devices. The liquid crystal substrate film usually has a thickness of 25–400 $\mu$m, an unevenness of the thickness over the entire surface of ±30% or less of the thickness, and an Rmax value of 0.2 $\mu$m or less. The liquid crystal substrate film preferably has an unevenness of the thickness over the entire surface of ±20% or less of the thickness, and an Rmax value of 0.1 $\mu$m or less. If the unevenness of the thickness is great or flatness and smoothness of the surface is insufficient, the screen of the liquid crystal display device may be distorted.

A polarizing film of the present invention is produced by attaching the film for display devices of the present invention as a protective layer to a polarizing film produced by using a PVA film or the like as abase. The thickness of the protective layer is usually 5–500 $\mu$m, preferably 10–300 $\mu$m, and still more preferably 20–200 $\mu$m. The protective layer may be provided on the polarizing film by using a tackiness agent or an adhesive. Use of a tackiness agent and an adhesive excelling in transparency is preferable. As specific examples of the tackiness agent and the adhesive, curable tackiness agents such as natural rubber, synthetic rubber, a vinyl acetate/vinyl chloride copolymer, polyvinyl ether, acrylic-based tackiness agents, modified polyolefin-based tackiness agents, and tackiness agents in which a curing agent such as an isocyanate is added to these materials, dry laminate adhesives in which a polyurethane resin solution and a polyisocyanate resin solution are mixed, synthetic rubber-based adhesives, epoxy-based adhesives, and the like can be given.

There are no specific limitations to the polarizing film used in the present invention insofar as the polarizing film has a function of a polarizer. As examples of the polarizing film, a PVA-iodine polarizing film, a dye-based polarizing film in which a dichromatic dye is adsorbed and oriented on a PVA film, a polyene-based polarizing film in which a polyene is formed by inducing a dehydration reaction of a PVA film or a dehydrochloration reaction of a polyvinyl chloride film, a polarizing film having a dichromatic dye on the surface and/or inside of a PVA film formed of modified PVA containing a cationic group in the molecule, and the like can be given. There are no specific limitations to the process for producing the polarizing film. For example, conventional methods such as a method of stretching a PVA film and causing an iodine ion to be adsorbed on the PVA film, a method of dyeing a PVA film using a dichromatic dye and stretching the PVA film, a method of stretching a PVA film and dyeing the PVA film using a dichromatic dye, a method of printing a dichromatic dye on a PVA film and stretching the PVA film, and a method of stretching a PVA film and printing a dichromatic dye on the PVA film can be given. In more detail, a process for producing a polarizing film by forming a higher order iodine ion by dissolving iodine in a potassium iodide solution, causing the iodine ion to be adsorbed on a PVA film, stretching the PVA film, and immersing the PVA film in a 1–4 wt % boric acid aqueous solution at 30–40° C., a process for producing a polarizing film by subjecting a PVA film to the boric acid treatment, stretching the PVA film about 3–7 times in the uniaxial direction, causing a dichromatic dye to be adsorbed on the PVA film by immersing the PVA film in a 0.05–5 wt % dichromatic dye aqueous solution at 30–40° C., and thermally securing the dye on the film by drying at 80–100° C., and the like can be given.

A surface protective film used in the present invention is the same as the film attached to the polarizing film in the production of the polarizing film. The surface protective film is attached to one side or each side of a thin film part for display devices in order to protect the surface of the thin film part.

A retardation film used in the present invention is produced by subjecting the above film for display devices to a stretching-orientation treatment or surface press. The thickness of the sheet before stretching is usually 25–500 $\mu$m, preferably 50–400 $\mu$m, and still more preferably 100–300 $\mu$m. As the stretching method, conventional uniaxial stretching methods such as a lateral uniaxial stretching method using a tenter method, an inter-roll compression stretching method, and a vertical uniaxial stretching method using rolls having different rims may be used. A biaxial stretching in which a film is stretched within the range which does not cause the orientation of the molecules to be affected, and stretched in the uniaxial direction so that the molecules are oriented may also be used. The film obtained in the above manner has a constant retardation value since the molecules are oriented by stretching. The retardation may be controlled by the retardation of the sheet before stretching, stretch magnification, stretch temperature, and thickness of oriented film. If the thickness of the sheet before stretching is constant, the absolute value of the retardation tends to be increased as the stretch magnification of the film is increased. Therefore, an oriented film having desired retardation can be obtained by changing the stretch magnification.

In the present invention, a preferable range of the retardation of the film obtained by using the above method differs depending upon the type or shape of the liquid crystal display, for which a film having a retardation value measured by using a polarization microscope of 5–900 nm is used. For example, a polarizing film used for a TFT liquid crystal display device must have high transparency. Therefore, an optically homogenous film having retardation of 10–80 nm is suitably used.

A transparent conductive film of the present invention is produced by forming a transparent conductive layer on a film formed of the transparent resin of the present invention. As a material for forming the transparent conductive layer, a metal such as Sn, In, Ti, Pb, Au, Pt, or Ag, or an oxide of these metals is generally used. These metals are deposited on the liquid crystal substrate film to a thickness of usually 10–10,000 angstroms, and preferably 50–5,000 angstroms by using a plasma method, sputtering method, vacuum deposition method, plating, ion plating method, spray method, electrolytic deposition method, or the like. In the case of forming a single metal on the film, the metal element may optionally be oxidized thereafter. The conductive layer may be formed as an oxide layer, or formed by forming a film in the form of a single metal or a lower oxide, and subjecting the film to an oxidation treatment such as thermal oxidation, anodic oxidation, or liquid phase oxidation. The resistivity of the transparent conductive film is preferably 100 ohmcm or less.

A light diffusion film of the present invention is produced by forming a pattern having a shape which has a diffusing function on one side of a film formed of the transparent resin of the present invention. The pattern having a shape which has a diffusing function may be formed by embossing, applying a photocurable resin such as a UV-curable resin, or applying various types of coat materials.

As the photocurable resin used for forming the pattern on the film of the present invention, a composition containing at least one compound having one and more ethylenically double bonds such as a (meth)acryloyl group in the molecule and a photoinitiator, a composition containing at least one compound having one and more groups having ring-opening reactivity such as an epoxy group in the molecule and a cationic photoinitiator, a composition containing gelatin and bichromate, a composition containing cyclized rubber and a bisazide-type sensitizer, a composition containing a novolac resin and a quinoneazide-type sensitizer, and the like can be given. The surface of the film may be subjected to a physical base processing such as a plasma processing or a chemical base processing by using various types of coat materials such as conventional rubber-based, resin-based, in particular, acrylic-based, and silicon-based coat materials before applying the photocurable resin in order to control adhesion of the surface of the film or sheet.

A prism sheet for improving brightness of a display device by collecting diffused light passing through the light diffusion film at an angle of view of the display device is produced by providing a minute prism angle at the surface of a transparent film. The prism sheet can be produced by embossing a pattern of a prism angle on the surface of a film formed of the transparent resins of the present invention, or forming the pattern by applying a photocurable resin such as a UV-curable resin in the same manner as the above light diffusion film.

A film or a sheet including the optically transparent material of the present invention is useful as a film for EL display devices. As the film for EL display devices, a substrate film, polarizing film, surface protective film, transparent conductive film, which are used for the liquid crystal display device, and the like can be given. Characteristics of these films are not necessarily the same as those of the films used for the liquid crystal display device.

The film or sheet including the optically transparent material of the present invention may be used as a transparent conductive composite material by forming a transparent conductive film on the surface of the film. The transparent conductive composite material is useful as an electrode film for the liquid crystal display device and the EL display device and as an electromagnetic preventive film for electronic equipment such as a CRT.

The film or sheet of the present invention may be used as a antireflection film by forming an antireflection film of which a layer in contact with the surface of the film or sheet is formed of SiOx (0.8←x←1.8) and an outermost layer is formed of $SiO_2$ on the surface of the film or sheet. Since the antireflection film excels in heat resistance, the antireflection film is useful not only for the liquid crystal display device and the EL display device, but also for a plasma display, a field emission display, or the like.

In the case of using the films for display devices of the present invention so that the films are adjacent to each other, the number of parts, and the thickness and the weight of the display device can be decreased by integrating the films in advance. For example, the liquid crystal substrate film and the polarizing film, the retardation film and the transparent conductive film, the light diffusion film and the prism sheet, or the polarizing film and the light diffusion film may be integrated in advance. These films are bonded to each other by forming an adhesive layer and/or an anchor coat layer therebetween. As the adhesive layer, a heat resistant resin such as an epoxy resin, polyimide, polybutadiene, phenol resin, and polyether ether ketone can be given. As the anchor coat layer, a compound containing an acrylic prepolymer such an epoxy diacrylate, urethane diacrylate, and polyester diacrylate as a component may be used. As the curing method, a conventional technique such as curing by using ultraviolet rays or heat may be used.

Since the film for display devices of the present invention excels in optical transparency, heat resistance, moisture resistance, liquid crystal resistance, dimensional stability, and adhesion, the film is suitably used in the manufacture of the liquid crystal display device and the EL display device. These display devices may be used for personal computers, TVs, portable telephones, digital information terminals, pocket bells, car navigations, liquid crystal monitors, light modulator panels, displays for OA equipment, displays for AV equipment, and the like.

In addition, the film of the present invention is useful for optical parts such as light guiding plates, OHP films, optical disks, optical fibers, and lenses, electronic parts, coating materials, adhesives, medical containers, and containers.

EXAMPLES

The present invention is described in more detail by examples. However, the present invention is not limited by these examples.

The molecular weight, total light transmittance, glass transition temperature, coefficient of linear expansion, water absorption, adhesion, degree of swelling in toluene, tensile strength, elongation, viscosity of a polymer solution, and retardation value were measured by the following methods.

(1) Weight Average Molecular Weight and Number Average Molecular Weight

The molecular weight was measured at 120° C. by using a 150 C. gel permeation chromatography (GPC) system (manufactured by Waters) using an H-type column (manufactured by Tosoh Corp.) and o-dichlorobenzene as a solvent. The resulting molecular weight is indicated by a standard polystyrene-reduced value.

(2) Refractive Index

The refractive index $n^{25}{}_D$ at 25° C. and at a D line (589 nm) was measured according to ASTM-D542.

(3) Total Light Transmittance

The total light transmittance of a film with a thickness of 150 μm was measured according to ASTM-D1003.

(4) Peak Temperature of Tan δ (Glass Transition Temperature)

The glass transition temperature of the polymer was determined by a peak temperature of Tan δ measured by dynamic viscoelasticity (ratio of storage modulus of elasticity E' to loss modulus of elasticity E" E"/E'=Tan δ).

The dynamic viscoelasticity was determined by a peak temperature of a temperature variance of Tan δ measured by using "Leovibron DDV-01FP" (manufactured by Orientec Co., Ltd.) at a measurement frequency of 10 Hz, a temperature increase rate of 4° C./min., a single waveform vibration mode, and a vibration amplitude of 2.5 μm.

(5) Coefficient of Linear Expansion

A sample (3 cm×10 mm×100 μm) was secured in a thermal mechanical analyzer (TMA) SS6100 (manufactured by Seiko Instrument Co., Ltd.) at a chuck distance of 10 mm and heated from room temperature to 200° C. to remove residual strain. The sample was heated from room temperature at a rate of 3° C./min. to determine the coefficient of linear expansion from the elongation of the chuck distance.

(6) Water Absorption

A film or a sheet was immersed in water at 23° C. for 24 hours. Water absorption was measured from a change in weight of the film or sheet.

(7) Adhesion

Aluminum was deposited on a test specimen with a dimensions of 10 cm×10 cm. The deposited film was cut into 10×10 squares, each having a length of 1 cm and a width of 1 cm, and subjected to a peeling test using an adhesive tape to measure the number of peeled blocks among the 25 blocks.

(8) Degree of Swelling in Toluene

A film with a length of 2 cm, a width of 2 cm, and a thickness of 50–250 μm was immersed in toluene for three hours at 25° C. The weight of the film before and after immersion was measured. The degree of swelling was calculated according to the following equation.

Degree of swelling in toluene (%)=(weight after immersion in toluene/weight before immersion in toluene)×100

(9) Tensile Strength and Elongation (Alternative Characteristics of Fragility and Cracks)

The tensile strength and elongation of a test specimen were measured at a tensile rate of 3 mm/min. according to JIS K7118.

(10) Viscosity of Polymer Solution

The viscosity of the polymer solution was measured at 25° C. by using a RE80L rotational viscometer (manufactured by Toki Sangyo Co., Ltd.) and 3°×R14 as a rotor.

(11) Retardation Value

The retardation value was measured at a wavelength of 633 nm by using an ellipsometer "DVA-36LS" (manufactured by Mizojiri Optical Co., Ltd.).

Example 1

A 2,000-ml reaction vessel was charged with 1,187.5 mmol (111.6 g) of bicyclo[2.2.1]hept-2-ene and 62.5 mmol (14.9 g) of 5-[1',4',4'-trimethyl-2',6'-dioxa-1'-silacyclohexyl]-bicyclo[2.2.1]hept-2-ene as monomers, 633 g of toluene as a solvent, and 15.0 mmol of styrene as a molecular weight modifier in an nitrogen atmosphere.

After the addition of 0.25 mmol (as a nickel atom) hexafluoroantimonic acid modified product of nickel octanoate which was prepared by reacting nickel octanoate in a hexane solution and hexafluoroantimonic acid at a molar ratio of 1:1 at −10° C., removing a precipitated byproduct $Ni(SbF_6)_2$, and diluting the resulting product with a toluene solution, 2.50 mmol of methyl alumoxane, and 0.75 mmol of boron trifluoride ethyl etherate, the monomers were polymerized at 30° C. for three hours.

The polymerization was terminated by the addition of methanol.

The conversion rate of the monomers into the copolymer was 95%.

660 ml of water and 47.5 mmol of lactic acid were added to the copolymer solution and allowed to react with the catalyst component while stirring. The copolymer solution was allowed to separate from water. The copolymer solution from which the water phase containing a reaction product of the catalyst component was removed was placed in 3 l of isopropanol to coagulate the copolymer. Unreacted monomers and catalyst residues were then removed. The coagulated copolymer was dried to obtain a copolymer A.

Figure 2:
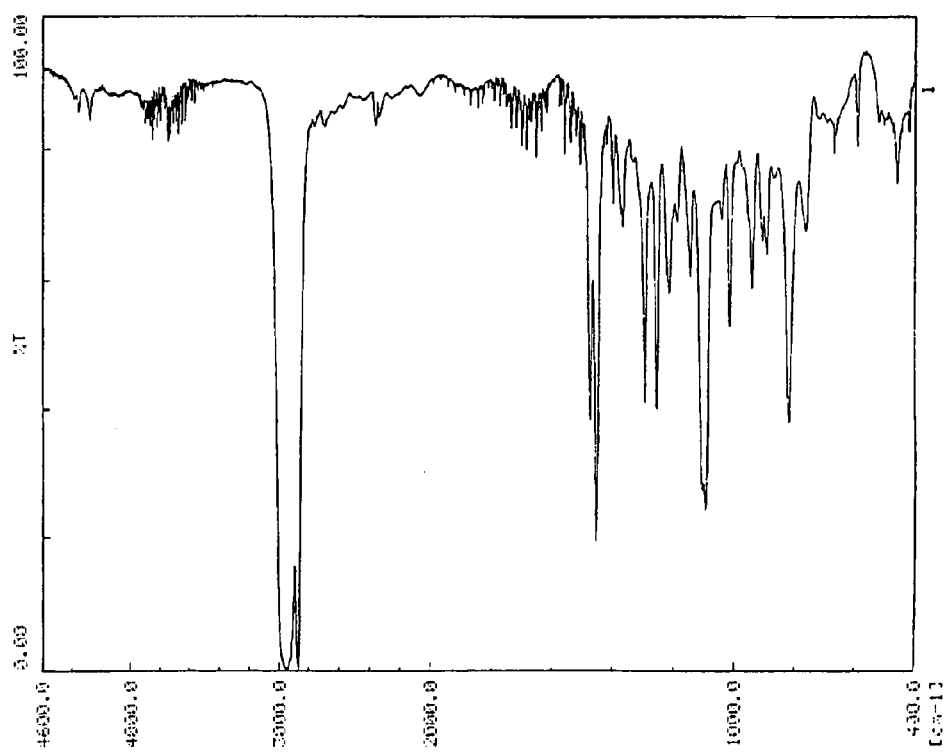
FIG. 2 shows an infrared absorption spectrum of the copolymer A obtained in Example 1.

The content of a structural unit originating from 5-[1'4'4'-trimethyl-2'6'-dioxa-1'-silacyclohexyl]-bicyclo[2.2.1]hept-2-ene in the copolymer was 4.8 mol %. The content was measured by 270 MHz $^1$H-NMR (nuclear magnetic resonance) analysis (calculated from the ratio of absorption by $CH_2$ in the Si—O—$CH_2$— group at 3.7 ppm to absorption by all protons of norbornene nucleus at 0.9–3.0 ppm, solvent: deuterated toluene, TMS: 0 ppm). FIG. 1 shows a $^1$H-NMR chart of the copolymer A. FIG. 2 shows an infrared absorption spectrum of the copolymer A.

The polystyrene-reduced number average molecular weight (Mn) and weight average molecular weight (Mw) of the copolymer A were respectively 95,000 and 390,000. The Mw/Mn was 4.1.

10 g of the copolymer A was dissolved in 35.5 g of toluene. 0.9 part by weight of pentaerythritol-tetrakis[3-(3, 5-di-t-butyl-4-hydroxyphenyl) propionate] and 0.9 part by weight of tris (2,4-di-t-butylphenyl) phosphite for 100 parts by weight of the copolymer were added to the mixture as antioxidants. The copolymer solution was cast to form a film A-1 with a thickness of 150 μm.

Various properties of the film were evaluated. The evaluation results are shown in Table 1.

0.09 g of each of the above antioxidants and 0.14 g of tributyl phosphite were added to a polymer solution in which 10 g of the copolymer A was dissolved in 35.5 g of toluene. The copolymer solution was cast to form a film. The film was allowed to stand at 200° C. for two hours under reduced pressure to remove the solvent in the film. The film was allowed to stand at 150° C. for two hours in vapor to form a crosslinked film A-2 with a thickness of 150 μm.

The viscosity (25° C.) of the polymer solution used for preparing the film A-2 was 2,900 centipoises (cp). The viscosity (25° C.) of the polymer solution stored at 25° C. for one week in nitrogen atmosphere was 2,900 cp.

The evaluation results are shown in Table 1.

0.09 g of each of the above antioxidants, 0.0012 g of tin (II) 2-ethylhexanoate, 0.07 g of tributyl phosphite, and 1.0 g of tetraethoxysilane were added to a polymer solution in which 10 g of the copolymer A was dissolved in 35.5 g of toluene. The copolymer solution was allowed to stand at 25° C. for two hours at a humidity of 80%. The copolymer solution was cast to form a film. The film was allowed to stand at 200° C. for two hours under reduced pressure to remove the solvent in the film.

The film was allowed to stand at 150° C. for two hours in vapor to form a crosslinked film A-3 with a thickness of 150 μm. The evaluation results are shown in Table 1.

Example 2

A copolymer B was obtained in the same manner as in Example 1 except for using 1,125 mmol of bicyclo[2.2.1] hept-2-ene and 125 mmol of 5-[1'4'4'-trimethyl-2',6'-dioxa-1'-silacyclohexyl]-bicyclo[2.2.1]hept-2-ene as monomers. The conversion rate into the copolymer was 95%.

The content of a structural unit originating from 5-[1'4'4'-trimethyl-2',6'-dioxa-1'-silacyclohexyl]-bicyclo[2.2.1]hept-2-ene in the copolymer B measured by 270 MHz $^1$H-NMR was 8.0 mol %.

Figure 3:
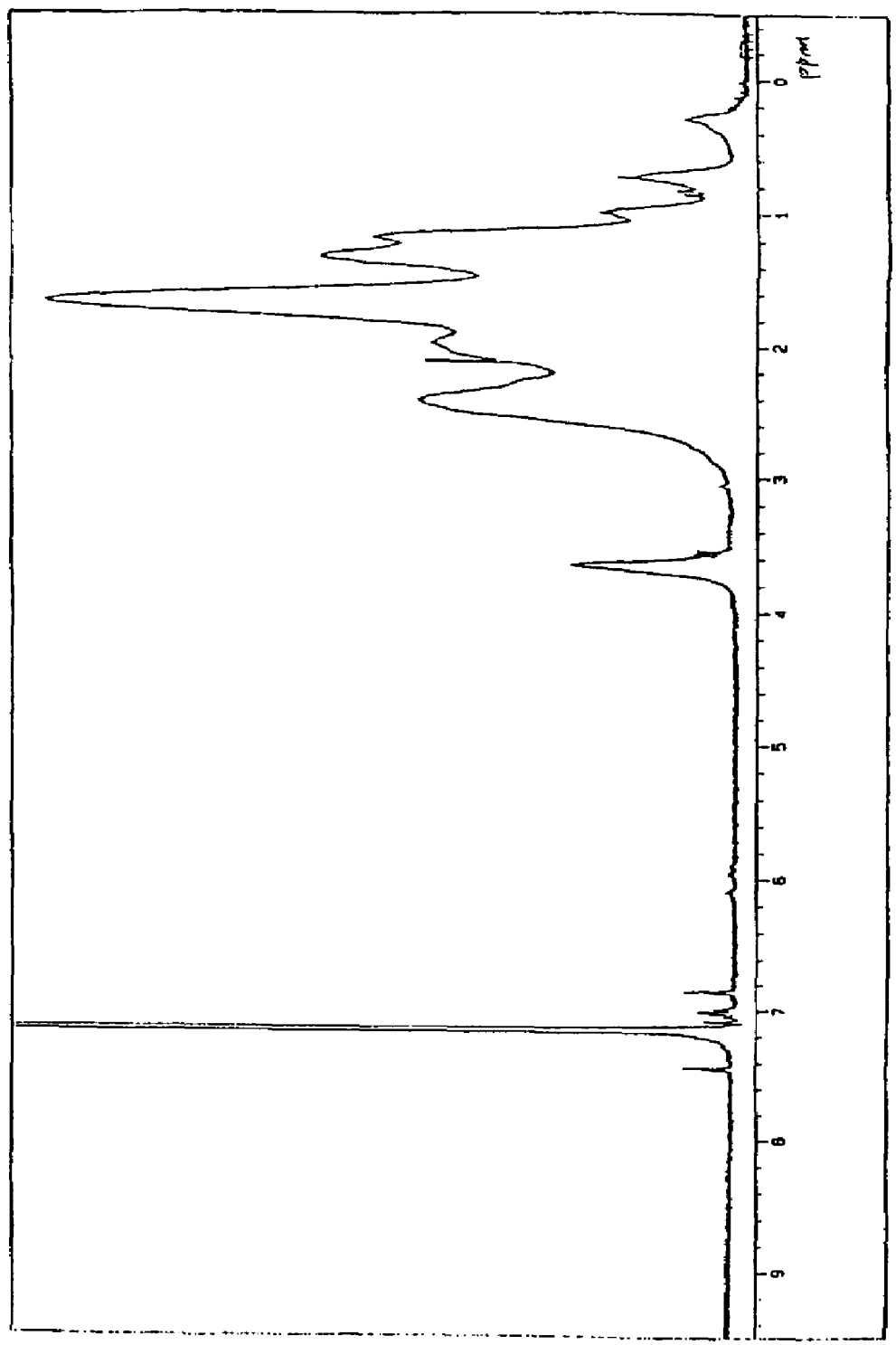
FIG. 3 shows a $^1$H-NMR chart of a copolymer B obtained in Example 2.
Figure 4:
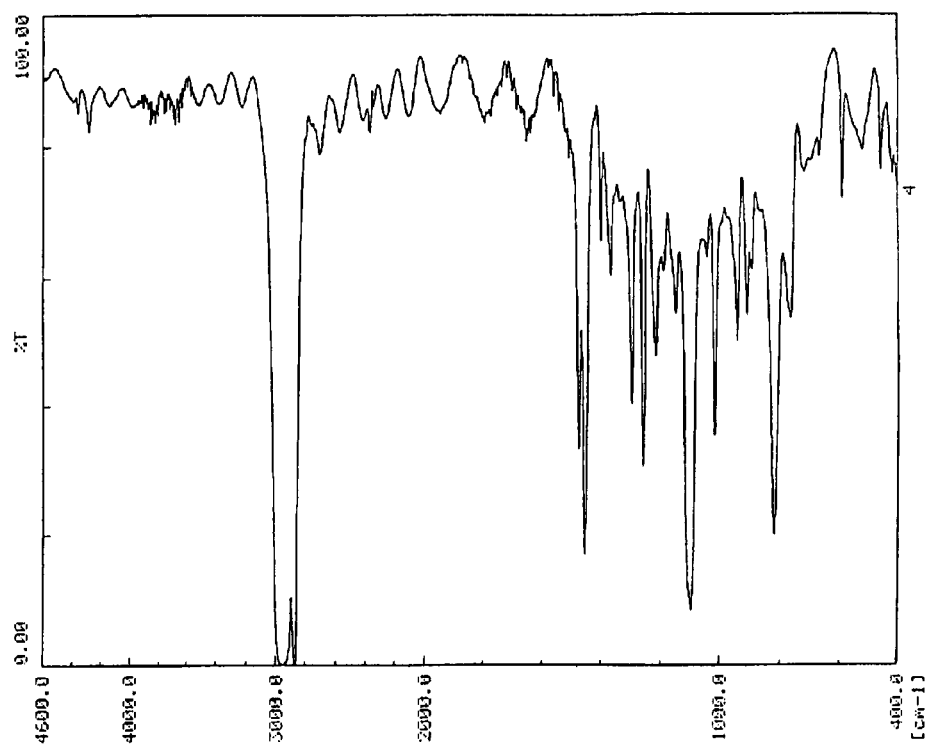
FIG. 4 shows an infrared absorption spectrum of the copolymer B obtained in Example 2.

The Mn and Mw of the copolymer B were respectively 85,000 and 350,000. The Mw/Mn was 4.1. FIG. 3 shows a $^1$H-NMR chart of the copolymer B. FIG. 4 shows an infrared absorption spectrum of the copolymer B.

A non-crosslinked film B-1, a crosslinked film B-2, and a crosslinked composite film B-3 by using tetraalkoxysilane, each having a thickness of 150 μm, were prepared in the same manner as in Example 1. A film B-4 in which colloidal silica (average particles diameter: 10 nm) subjected to a surface treatment using tetraethoxysilane was added to the polymer in an amount of 3 wt % as $SiO_2$ instead of tetraethoxysilane was also prepared.

The viscosity (25° C.) of the polymer solution used for preparing the film B-2 measured in the same manner as in Example 1 was 3,600 cp. The viscosity (25° C.) of the polymer solution stored at 25° C. for one week was 3,650 cp. The evaluation results are shown in Table 1.

Example 3

A copolymer C was obtained in the same manner as in Example 1 except for using 1,187.5 mmol of bicyclo [2.2.1] hept-2-ene and 62.5 mmol of 5-[1'-phenyl-4',4'-dimethyl-2', 6'-dioxa-1'-silacyclohexyl]-bicyclo[2.2.1]hept-2-ene as monomers.

Figure 5:
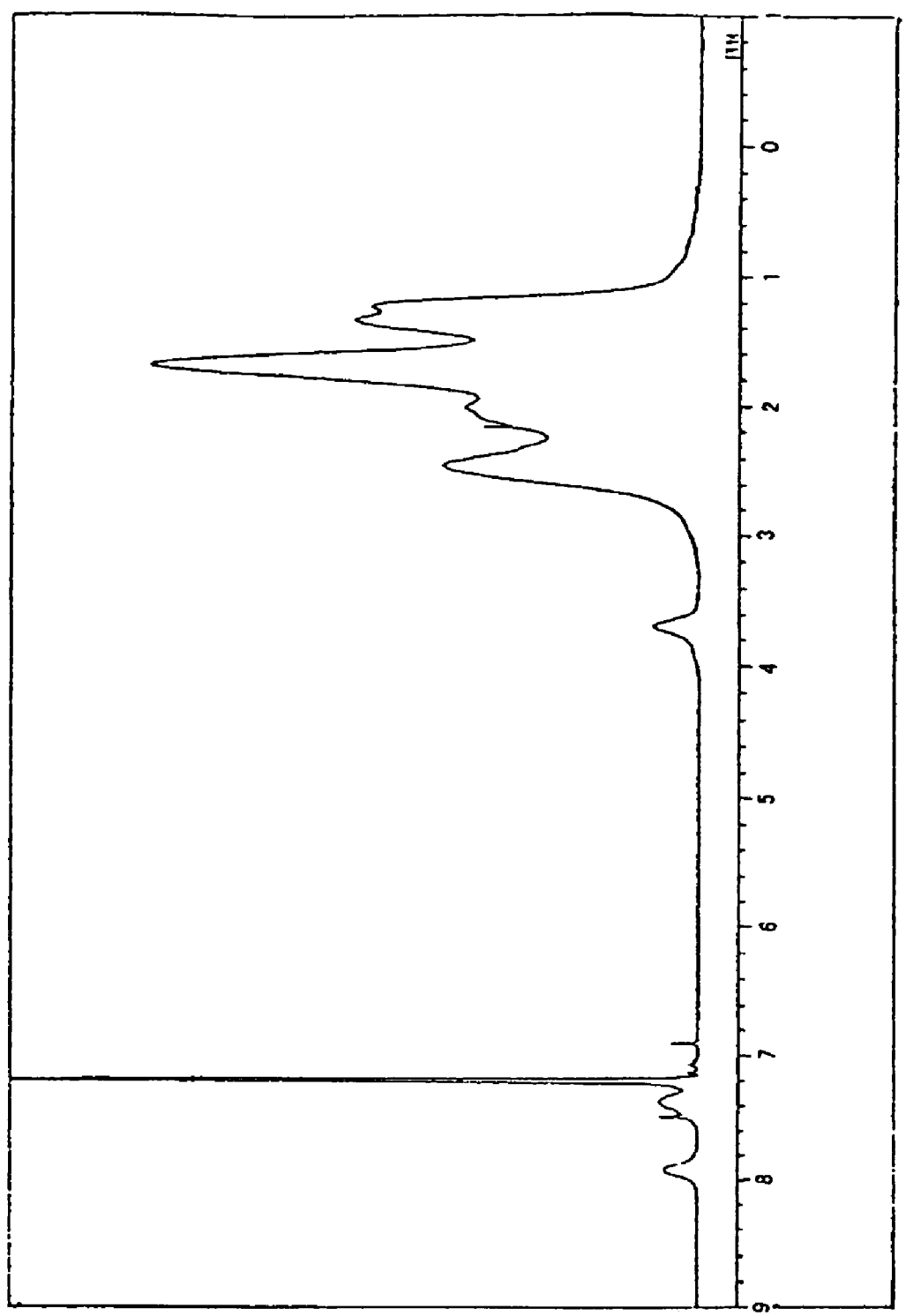
FIG. 5 shows a $^1$H-NMR chart of a copolymer C obtained in Example 3.
Figure 6:
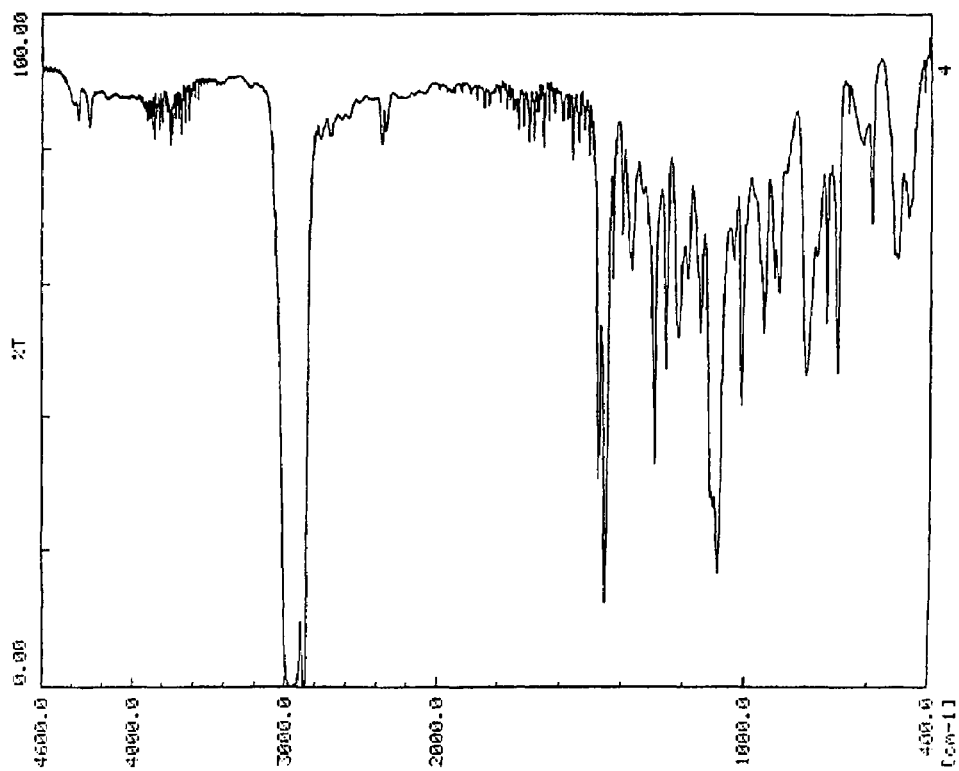
FIG. 6 shows an infrared absorption spectrum of the copolymer C obtained in Example 3.

The content of a structural unit originating from 5-[1'-phenyl-4',4'-dimethyl-2',6'-dioxa-1'-silacyclohexyl]-bicyclo [2.2.1]hept-2-ene in the copolymer C measured by 270 MHz $^1$H-NMR was 4.2 mol %. FIG. 5 shows a $^1$H-NMR chart of the copolymer C. FIG. 6 shows an infrared absorption spectrum of the copolymer C.

The Mn and Mw of the copolymer C were respectively 99,000 and 297,000. The Mw/Mn was 3.0.

A non-crosslinked film C-1 and a crosslinked film C-2, each having a thickness of 150 μm, were prepared in the same manner as in Example 1. Properties of the films were evaluated.

The viscosity (25° C.) of the polymer solution used for preparing the film C-2 measured in the same manner as in Example 1 was 2,200 cp. The viscosity (25° C.) of the polymer solution stored at 25° C. for one week was 2,250 cp. The evaluation results are shown in Table 1.

Example 4

A 2,000-ml reaction vessel was charged with 1,050 mmol of bicyclo[2.2.1]hept-2-ene, 75.0 mmol of 5-[1'-methyl-4'-ethyl-4'-butyl-2',6'-dioxa-1'-silacyclohexyl]-bicyclo[2.2.1] hept-2-ene, and 125 mmol of 8-methyl-8-methoxycarbonyltetracyclo[4.4.0.1$^{2,5}$1$^{7,10}$]dodec-3-ene as monomers, 18 mmol of styrene as a molecular weight modifier, and 660 g of toluene as a solvent in an nitrogen atmosphere.

The reaction system was maintained at 10° C. After the addition of a mixture of 0.20 mmol of triethylaluminum and 2.5 mmol of methyl alumoxane, 0.75 mmol of boron trifluoride ethyl etherate, and 0.25 mmol (as nickel atoms) of a nickel compound prepared by reacting nickel octanoate and hexafluoroantimonic acid at a molar ratio of 1:1 at −15° C., the monomers were polymerized at 20° C. for two hours. The polymerization was terminated by the addition of ethanol. The conversion rate of the monomers into the copolymer was 89%. The copolymer thus obtained is referred to as a copolymer D.

Figure 7:
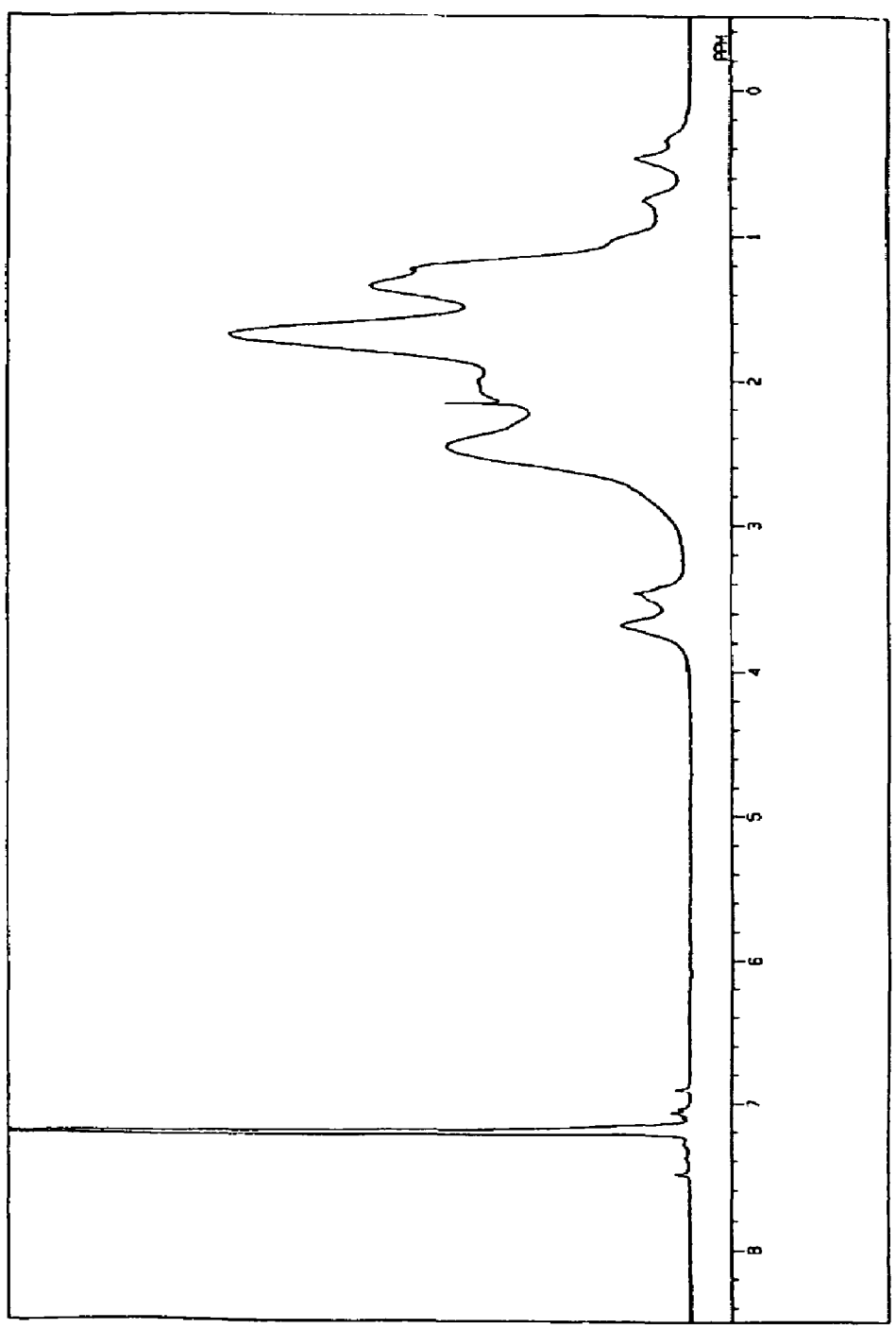
FIG. 7 shows a $^1$H-NMR chart of a copolymer D obtained in Example 4.
Figure 8:
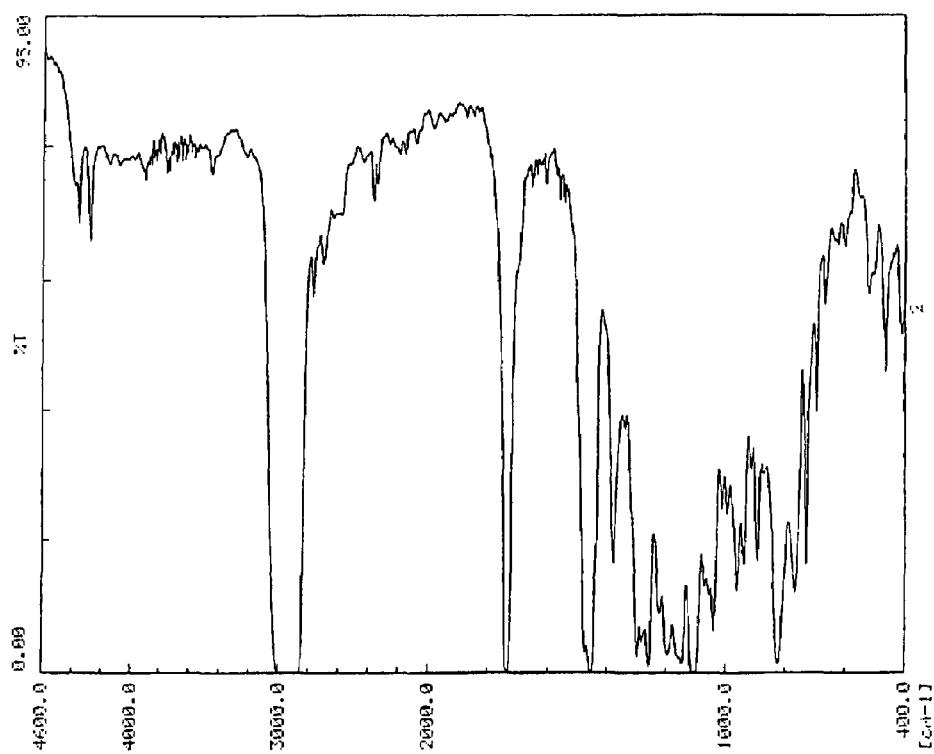
FIG. 8 shows an infrared absorption spectrum of the copolymer D obtained in Example 4.

The content of a structural unit originating from 5-[1'-methyl-4'-ethyl-4'-butyl-2',6'-dioxa-1'-silacyclohexyl]-bicyclo[2.2.1]hept-2-ene in the copolymer D measured by 270 MHz $^1$H-NMR was 4.9 mol %. The content of a structural unit originating from 8-methyl-8-methoxycarbonyltetracyclo[4.4.0.1$^{2,5}$1$^{7,10}$]dodec-3-ene was 5.9 mol %. FIG. 7 shows a $^1$H-NMR chart of the copolymer D. FIG. 8 shows an infrared absorption spectrum of the copolymer D.

The Mn and Mw of the copolymer D maesured by GPC were respectively 80,000 and 280,000. The Mw/Mn was 3.5.

A toluene solution of the copolymer D was cast to form a non-crosslinked film D-1 and a crosslinked film D-2, each having a thickness of 150 μm, in the same manner as in Example 1. Properties of the films were evaluated.

The viscosity (25° C.) of the polymer solution used for preparing the film D-2 measured in the same manner as in Example 1 was 3,100 cp. The viscosity (25° C.) of the polymer solution stored at 25° C. for one week was 3,200 cp. The evaluation results are shown in Table 1.

Example 5

A copolymer E was obtained in the same manner as in Example 2 except for using 125 mmol of 5-[1'-methyl-2',6'-dioxa-1'-silacyclohexyl]-bicyclo[2.2.1]hept-2-ene instead of using 125 mmol of 5-[1',4',4'-trimethyl-2',6'-dioxa-1'-silacyclohexyl]-bicyclo[2.2.1]hept-2-ene. The conversion rate of the monomers into the copolymer was 89%.

Figure 9:
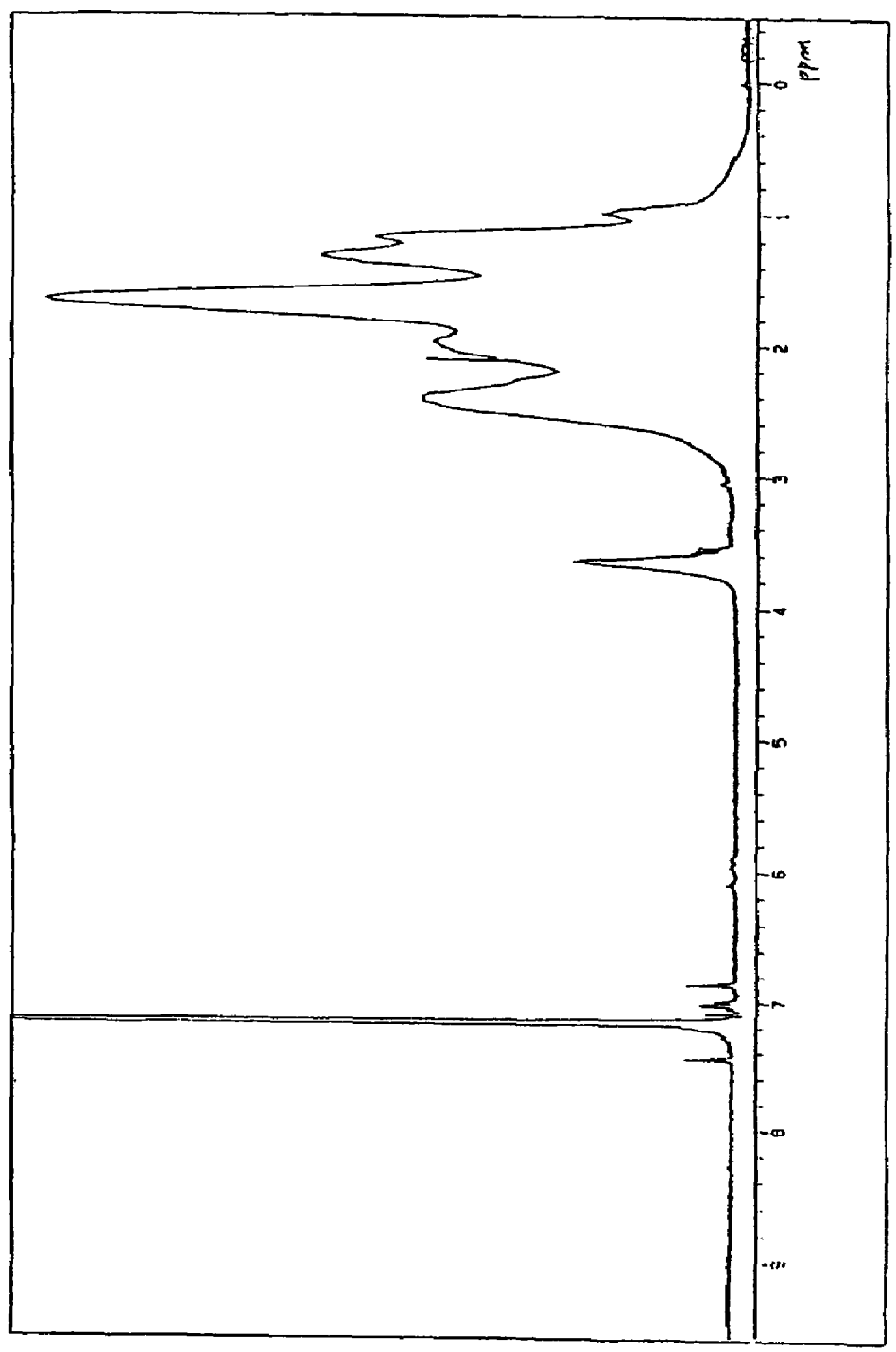
FIG. 9 shows a $^1$H-NMR chart of a copolymer E obtained in Example 5.
Figure 10:
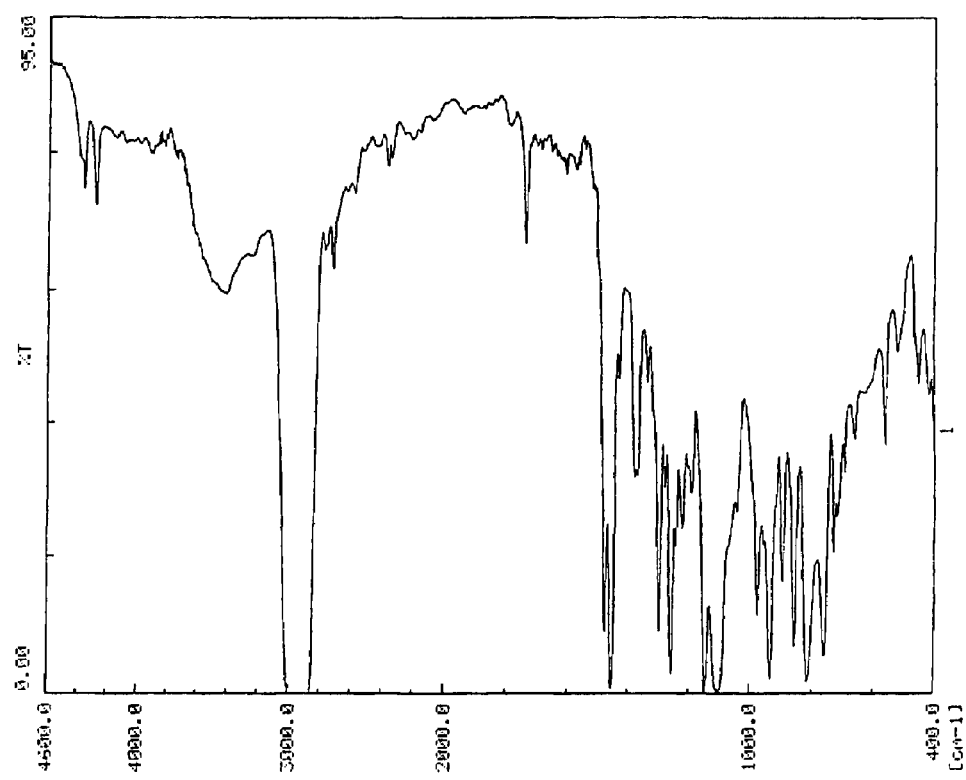
FIG. 10 shows an infrared absorption spectrum of the copolymer E obtained in Example 5.

The content of a structural unit originating from 5-[1'-methyl-2',6'-dioxa-1'-silacyclohexyl]-bicyclo[2.2.1]hept-2-ene in the copolymer E measured by 270 MHz $^1$H-NMR was 8.9 mol %. FIG. 9 shows a $^1$H-NMR chart of the copolymer E. FIG. 10 shows an infrared absorption spectrum of the copolymer E.

The Mn and Mw of the copolymer E were respectively 77,000 and 270,000. The Mw/Mn was 3.5.

A non-crosslinked film E-1, a crosslinked film E-2, a crosslinked film E-3 by using 10 wt % of tetraethoxysilane, and a crosslinked film E-4 by using 3 wt % of colloidal silica (average particle diameter: 10 nm) subjected to a hydrophobization treatment using tetraethoxysilane were prepared in the same manner as in Example 1. Properties of these films were evaluated.

The viscosity (25° C.) of the polymer solution used for preparing the film E-2 measured in the same manner as in Example 1 was 3,000 cp. The viscosity (25° C.) of the polymer solution stored at 25° C. for one week was 3,050 cp. The evaluation results are shown in Table 1.

Example 6

A copolymer F was obtained in the same manner as in Example 1 except for using 1,137.5 mmol of bicyclo[2.2.1]hept-2-ene, 50 mmol of 5-[1',4',4'-trimethyl-2',6'-dioxa-1'-silacyclohexyl]-bicyclo[2.2.1]hept-2-ene, and 62.5 mmol of tetracyclo[4.4.0.1$^{2,5}$.1$^{7,10}$]dodec-3-ene as monomers. The conversion rate of the monomers into the copolymer was 94%.

Figure 11:
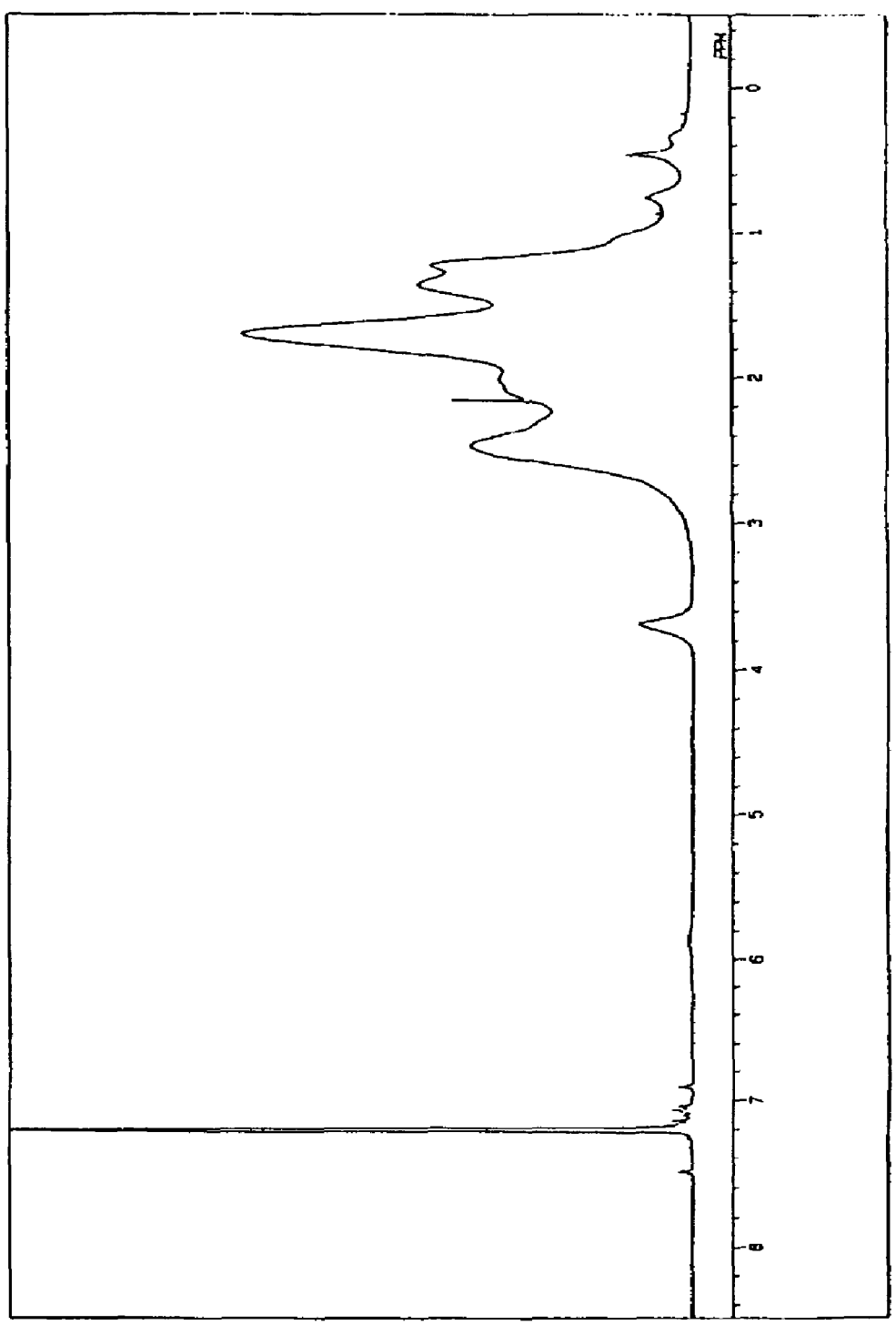
FIG. 11 shows a $^1$H-NMR chart of a copolymer F obtained in Example 6.
Figure 12:
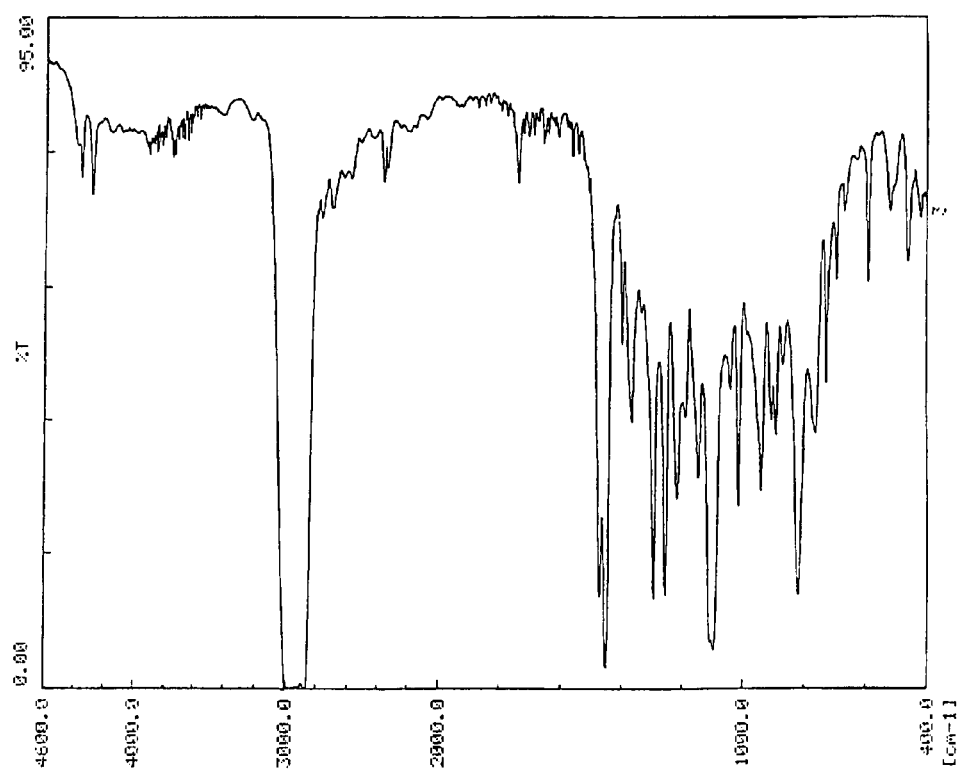
FIG. 12 shows an infrared absorption spectrum of the copolymer F obtained in Example 6.

The content of unreacted bicyclo[2.2.1]hept-2-ene and tetracyclo[4.4.0.1$^{2,5}$.1$^{7,10}$]dodec-3-ene remaining in the copolymer solution was measured by gas chromatography analysis to calculate the content of structural units of these compounds in the copolymer. The total content of bicyclo[2.2.1]hept-2-ene and tetracyclo[4.4.0.1$^{2,5}$.1$^{7,10}$]dodec-3-ene for a structural unit originating from 5-[1',4',4'-trimethyl-2',6'-dioxa-1'-silacyclohexyl]-bicyclo[2.2.1]hept-2-ene in the copolymer F measured by 270 MHz $^1$H-NMR was determined. The content of a structural unit originating from tetracyclo[4.4.0.1$^{2,5}$1$^{7,10}$]dodec-3-ene was 4.9 mol %. The content of a structural unit originating from 5-[1',4',4'-trimethyl-2',6'-dioxa-1'-silacyclohexyl]-bicyclo[2.2.1]hept-2-ene was 3.8 mol %. FIG. 11 shows a $^1$H-NMR chart of the copolymer F. FIG. 12 shows an infrared absorption spectrum of the copolymer F.

The Mn and Mw of the copolymer F were respectively 86,000 and 344,000. The Mw/Mn was 4.0.

A non-crosslinked film F-1, a crosslinked film F-2, and a crosslinked film F-3 by using 10 wt % of dimethyldimethoxysilane, each having a thickness of 150 μm, were prepared in the same manner as in Example 1. Properties of these films were evaluated.

The viscosity (25° C.) of the polymer solution used for preparing the film F-2 measured in the same manner as in Example 1 was 3,500 cp. The viscosity (25° C.) of the polymer solution stored at 25° C. for one week was 3,500 cp. The evaluation results are shown in Table 1.

Comparative Example 1

A copolymer H was obtained in the same manner as in Example 1 except for using 5-triethoxysilyl-bicyclo[2.2.1]hept-2-ene instead of 5-[1',4',4'-trimethyl-2',6'-dioxa-1'-silacyclohexyl]-bicyclo[2.2.1]hept-2-ene.

The content of a structural unit originating from 5-triethoxysilyl-bicyclo[2.2.1]hept-2-ene in the copolymer H measured by 270 MHz $^1$H-NMR was 4.8 mol %. The Mn and Mw of the copolymer H were respectively 105,000 and 367,000. The Mw/Mn was 3.5.

A non-crosslinked film H-1, a crosslinked film H-2, and, a crosslinked film H-3 by using 10 wt % of tetraethoxysilane, each having a thickness of 150 μm, were prepared in the same manner as in Example 1.

The viscosity (25° C.) of the polymer solution used for preparing the film H-2 measured in the same manner as in Example 1 was 2,500 cp. The viscosity (25° C.) of the polymer solution stored at 25° C. for one week was 10,000 cp. The evaluation results are shown in Table 1.

Comparative Example 2

A copolymer I was obtained in the same manner as in Comparative Example 1 except for using 1,125 mmol of bicyclo[2.2.1]hept-2-ene and 125 mmol of 5-triethoxysilyl-bicyclo[2.2.1]hept-2-ene as monomers, 12.5 mmol of 1-hexene as a molecular weight modifier, and 2.5 mmol of triethylaluminum as an organoaluminum compound of a catalyst component. The conversion rate of the monomers into the copolymer was 96%.

The Mn and Mw of the copolymer I were respectively 328,000 and 121,000. The Mw/Mn was 2.7.

The content of a structural unit originating from 5-triethoxysilyl-bicyclo[2.2.1]hept-2-ene in the copolymer I measured by 270 MHz $^1$H-NMR was 4.9 mol %. A non-crosslinked film I-1 and a crosslinked film I-2 were prepared in the same manner as in Comparative Example 1.

The viscosity (25° C.) of the polymer solution used for preparing the film I-2 measured in the same manner as in Example 1 was 3,000 cp. The viscosity (25° C.) of the polymer solution stored at 25° C. for one week was 6,000 cp. The evaluation results are shown in Table 1.

Comparative Example 3

A copolymer J was obtained in the same manner as in Example 1 except for using 62.5 mmol of 5-methyldiethoxysilyl-bicyclo[2.2.1]hept-2-ene instead of 62.5 mmol of 5-[1',4',4'-trimethyl-2',6'-dioxa-1'-silacyclohexyl]-bicyclo[2.2.1]hept-2-ene. The conversion rate of the monomers into the copolymer was 94%.

The Mn and Mw of the copolymer J were respectively 345,000 and 128,000. The Mw/Mn was 2.7.

The content of a structural unit originating from 5-methyldiethoxysilyl-bicyclo[2.2.1]hept-2-ene in the copolymer J measured by 270 MHz $^1$H-NMR was 4.7 mol %.

A non-crosslinked film J-1 and a crosslinked film J-2 were prepared in the same manner as in Example 1.

The viscosity (25° C.) of the polymer solution used for preparing the film J-2 measured in the same manner as in Example 1 was 2,400 cp. The viscosity (25° C.) of the polymer solution stored at 25° C. for one week was 5,000 cp. The evaluation results are shown in Table 1.

Example 7

Preparation of Transparent Conductive Film:

A film with a length of 200 mm, a width of 200 mm, and a thickness of 0.1 mm was prepared by using the technique for forming the crosslinked film A-2 in Example 1. An indium-tin oxide (ITO) film was formed on the resulting film using sputtering equipment (manufactured by Chugai Ro Co., Ltd.) under the following conditions.

Power supply: MHz high frequency power supply
Substrate temperature: 70° C.
Target: alloy of $In_2O_3/SnO_2$=90/10 (weight ratio)
Atmosphere: under reflux of argon gas
Sputtering rate: 270 angstrom/min.
Sputtering pressure: $10^{-2}$ Torr The resulting ITO film had a thickness of 2,500 angstroms and resistivity of $1.5 \times 10^{-3}$ ohmcm. Light transmittance of this transparent conductive composite material at 400–800 nm was 84%. Adhesion between the transparent conductive material and the ITO film was measured according to JIS K5400 (8,5,2 cross-cut test). As a result, no delamination was observed. The transparent conductive composite material did not show changes in conductivity and appearance after being allowed to stand at a temperature of 90° C. and a humidity of 95% for one week.

Table 2 shows the results for the adhesion test of the ITO film formed on the crosslinked films A-3, B-2 to B-4, C-2, and H-2 to H-3 obtained in the above examples.

TABLE 1

| | Film No. | Total light transmittance (%) | Glass transition temperature (° C.) | Water absorption (%) | Coefficient of linear expansion (ppm/° C.) | Adhesion (number of delamination) | Degree of swelling in toluene (%) | Breaking strength/ elongation (MPa/%) |
|---|---|---|---|---|---|---|---|---|
| Example 1 | A-1 | 91 | 370 | =<0.01 | 57 | 0 | Dissolved | 15/2.5 |
| | A-2 | 91 | — | =<0.01 | 53 | 1 | 190 | 27/3.5 |
| | A-3 | 90 | — | 0.01 | 52 | 1 | 175 | 20/3.0 |
| Example 2 | B-1 | 91 | 360 | 0.01 | 60 | 0 | Dissolved | 14/2.5 |
| | B-2 | 91 | — | =<0.01 | 55 | 0 | 190 | 27/4.0 |
| | B-3 | 90 | — | 0.01 | 53 | 0 | 170 | 21/3.0 |
| | B-4 | 90 | — | 0.01 | 49 | 0 | 160 | 23/3.1 |
| Example 3 | C-1 | 91 | 375 | =<0.01 | 58 | 0 | Dissolved | 15/2.9 |
| | C-2 | 91 | — | =<0.01 | 50 | 0 | 180 | 27/3.5 |
| Example 4 | D-1 | 91 | 380 | =<0.01 | 54 | 0 | Dissolved | 17/2.6 |
| | D-2 | 91 | — | =<0.01 | 48 | 0 | 180 | 29/3.2 |
| Example 5 | E-1 | 91 | 380 | =<0.01 | 57 | 0 | Dissolved | 15/2.7 |
| | E-2 | 91 | — | =<0.01 | 53 | 0 | 190 | 27/3.5 |
| | E-3 | 90 | — | 0.01 | 50 | 0 | 170 | 21/3.0 |
| Example 6 | F-1 | 91 | 385 | =<0.01 | 58 | 0 | Dissolved | 16/2.4 |
| | F-2 | 91 | — | =<0.01 | 51 | 0 | 175 | 28/3.2 |
| | F-3 | 90 | — | =<0.01 | 49 | 1 | 160 | 27/3.0 |
| Comparative Example 1 | H-1 | 91 | 370 | =<0.01 | 60 | 1 | Dissolved | 12/1.7 |
| | H-2 | 91 | — | =<0.01 | 55 | 1 | 180 | 24/3.0 |
| | H-3 | 90 | — | 0.01 | 52 | 2 | 160 | 16/2.4 |
| Comparative Example 2 | I-1 | 91 | 360 | 0.01 | 65 | 1 | Dissolved | 14/2.4 |
| | I-2 | 90 | — | 0.01 | 60 | 2 | 210 | 23/3.5 |
| Comparative Example 3 | J-1 | 91 | 375 | =<0.01 | 60 | 1 | Dissolved | 13/1.6 |
| | J-2 | 91 | — | =<0.01 | 56 | 1 | 230 | 24/3.0 |

TABLE 2

| | Crosslinked film | | | | | | | |
|---|---|---|---|---|---|---|---|---|
| | A-2 | A-3 | B-2 | B-3 | B-4 | C-2 | H-2 | H-3 |
| Adhesion with ITO film (rate of delamination, %) | 0 | 0 | 0 | 0 | 0 | 0 | 5 | 10 |

Example 8

Preparation of Film for Liquid Crystal Display Device and Liquid Crystal Substrate Film:

Variation of the retardation of the crosslinked film A-2 obtained in Example 1 at a wavelength of 633 nm was ±5%. An anchor agent solution consisting of a high-molecular-weight ionic complex ("Toyobine 210K" manufactured by Tosoh Corporation) containing water/alcohol (weight ratio: 50/50) as a solvent component was applied to the crosslinked film A-2 and dried at 90° C. for 5 minutes to form an aqueous anchor coat layer. An adhesive layer consisting of a urethane-based adhesive ("Takelac A-371" manufactured by Takeda Chemical Industries, Ltd.) and a curing agent ("Takenate A-10" manufactured by Takeda Chemical Industries, Ltd.) was formed on the aqueous anchor coat layer. An ethylene-vinyl alcohol copolymer/ dichromatic dye-based polarizing film was layered on the adhesive layer and pressed at a temperature of 80° C. and a pressure of 3 kg/cm² to form an integrated film. A transparent conductive layer was formed on the surface of the polarizing film by using a sputtering method utilizing a target consisting of indium oxide/tin oxide (weight ratio: 95:5). A liquid crystal display panel having a layer structure consisting of the transparent electrode/polarizing film/adhesive layer/aqueous anchor coat layer/substrate layer was obtained in this manner. Adhesion between the substrate layer and the polarizing film of the laminate was good. No delamination was observed between the substrate layer and the polarizing film. The laminate was subjected to a durability test at a temperature of 80° C. and a relative humidity of 90%. As a result, the laminate showed no abnormalities after 1000 hours of testing and exhibited good durability.

Example 9

Preparation of Surface Protective Film:

1 part by weight of stearyl-β-(3,5-di-t-butyl-4-hydroxyphenyl)propionate and 0.1 part by weight of tris (2,4-di-t-butylphenyl)phosphite were added to 100 parts by weight of the mixed solution prepared for forming the film A-1 in Example 1. A film with a thickness of 80 μm was formed by a casting method to obtain a surface protective film. The glass transition temperature of the film was 370° C. Variation of the retardation of the film at a wavelength of 633 nm was as small as ±5%.

Example 10

Preparation of Polarizing Film:

A polyvinyl alcohol film with a thickness of 50 μm was uniaxially stretched to four times the initial value for about five minutes while immersing the film in a bath at 40° C. containing 5.0 g of iodine, 250 g of potassium iodide, 10 g of boric acid, and 1,000 g of water. The surface of the resulting film was washed with alcohol and air-dried while maintaining tension to obtain a polarizing film. The above protective film was layered onto the polarizing film made of polyvinyl alcohol by using a tackiness agent prepared by mixing 100 parts by weight of an acrylic resin containing 90 wt % of n-butyl acrylate, 7 wt % of ethyl acrylate, and 3 wt % of acrylic acid with a crosslinking agent containing 2 parts by weight of 75 wt % ethyl acetate solution of a trimethylolpropane (1 mol) addition product of tolylene diisocyanate (3 mol). Adhesion between these layers was good. No delamination was observed. The laminate was subjected to a durability test at a temperature of 80° C. and a relative humidity of 90%. The polarizing film showed no abnormality after 1000 hours of testing and exhibited good durability.

Example 11

Preparation of Retardation Film:

A film with a thickness of 100 μm was prepared by using a casting method utilizing the mixed solution prepared for forming the film A-1 in Example 1. The film was uniaxially stretched at 300° C. to obtain a retardation film with a thickness of 80 μm. The retardation of the film at a wavelength of 633 nm was 136 μm. Variation of the retardation of the film was as small as ±5%. The wavelength dispersibility (α) of the retardation at a wavelength of 450–750 nm was 1.01.

Example 12

Preparation of EL Display Device:

A quinolinol complex solution was applied to the substrate (5 cm×5 cm) obtained in Example 7 on which the ITO film was formed. The solvent was removed to obtain an electroluminescent layer with a thickness of 50 nm. An electron transport light emitting layer with a thickness of 60 nm consisting of trisquinolinolate aluminum was formed on the electroluminescent layer. A magnesium/silver alloy (weight ratio: 10:1) film (cathode layer) with a length of 5 mm, a width of 5 mm, and a thickness of 100 nm was formed on the electron transport light emitting layer by using a vacuum deposition method. A laminate consisting of the above retardation film and a commercially available polarizing film ("NPF-F1225DU" manufactured by NittoDenko Co., Ltd.) was provided on the side of the substrate opposite to the side on which the ITO film was formed to obtain an EL display device.

The evaluation results for the EL display device thus obtained are as follows. Color tone: black, quality: no reflection of external scene, light reflectance (%): 0.2, adhesion: no delamination, durability under high temperature and high humidity conditions: no abnormality. The EL display device using the retardation film of the present invention was capable of preventing reflection of the external scene by cutting reflected light from the back electrode, whereby an EL display device capable of displaying a very clear screen even in a light place was obtained.

Example 13

Preparation of Light Diffusion Composite Sheet:

A film with a thickness of 0.1 mm was prepared by using the technique for forming the crosslinked film A-2 in Example 1. A solution of 10 g of a vinyl chloride-vinyl acetate copolymer containing methyl ethyl ketone/ethylene glycol (weight ratio: 40/0.1) as a solvent component was applied to the film and dried to form a resin film with a thickness of 30 μm. The film was immersed in hot water at 80° C. for 45 minutes. The film was then removed from the hot water and dried to obtain a light diffusion composite sheet with a thickness of 130 μm. The light transmittance of the transparent resin film was 75%. The particle diameter was 2–8 μm (individual bubbles).

Example 14

Preparation of Antireflection Film:

A film with a thickness of 100 μm was formed by using a casting method utilizing the mixed solution prepared for forming the film A-1 in Example 1. $SiO_2$ was deposited on the surface of the film to a thickness of 825 nm under vacuum at $10^{-4}$ Torr. $SiO_2$ was deposited to a thickness of 130 nm. A mixture of $ZrO_2$ and $TiO_2$ was deposited to a thickness of 130 nm. $SiO_2$ was deposited to a thickness of 248 nm as an outermost layer to obtain an antireflection film. The light transmittance of the antireflection film was as high as 90%. The birefringence of the antireflection film was as small as 2 nm.

According to the present invention, a cyclic olefin addition copolymer which has a reactive silyl group having a specific structure, excels in optical transparency, heat resistance, and adhesion, and is capable of producing a crosslinked product having improved dimensional stability, solvent resistance, and chemical resistance can be provided.

The cyclic olefin copolymer of the present invention and the optically transparent material (film for display devices) including a transparent resin formed of a composition containing the copolymer have optical transparency, heat resistance, liquid crystal resistance, dimensional stability, and adhesion and are suitably used as alternatives for a glass substrate of a liquid crystal display device and an EL display device. Moreover, the cyclic olefin copolymer and the optically transparent material can be used as a polarizing film, surface protective film, retardation film, transparent conductive film, light diffusion film, film for EL display devices, transparent conductive composite material, antireflection film, and the like.

Obviously, numerous modifications and variations of the present invention are possible in light of the above teachings. It is therefore to be understood that, within the scope of the appended claims, the invention may be practiced otherwise than as specifically described herein.

What is claimed is:

1. An optically transparent material comprising a cyclic olefin addition copolymer comprising a repeating unit (a) shown by the following formula (1) and a repeating unit (b) shown by the following formula (4), and having a number average molecular weight of 10,000 to 1,000,000:

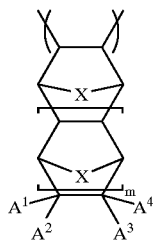

(1)

wherein $A^1$ to $A^4$ individually represent a hydrogen atom, a halogen atom, an alkyl group, alkenyl group, cycloalkyl group, or aryl group having 1–20 carbon atoms, or a reactive silyl group shown by the following formula (2) or (3), provided that at least one of $A^1$ to $A^4$ represents the reactive silyl group, X represents —$CH_2$— or —O—, and m is either 0 or 1;

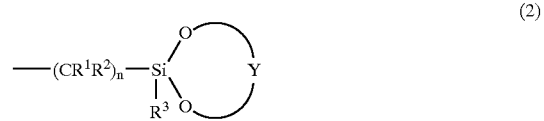

(2)

wherein $R^1$, $R^2$, and $R^3$ individually represent a hydrogen atom or a hydrocarbon group having 1–20 carbon atoms, n is an integer from 0 to 5, and Y represents a hydrocarbon residue of an aliphatic diol, an alicyclic diol, or an aromatic diol having 2–20 carbon atoms;

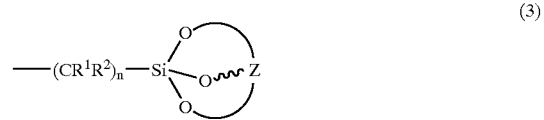

(3)

wherein $R^1$ and $R^2$ individually represent a hydrogen atom or a hydrocarbon group having 1–20 carbon atoms, n is an integer from 0 to 5, and Z represents a hydrocarbon residue of an aliphatic triol, an alicyclic triol, or an aromatic triol having 4–20 carbon atoms;

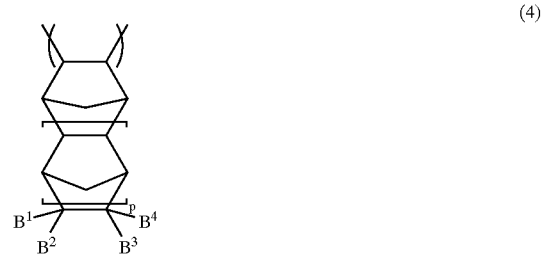

(4)

wherein $B^1$ to $B^4$ individually represent a hydrogen atom, a substituent selected from a halogen atom, an alkyl group, cycloalkyl group, aryl group, alkenyl group, halogenated hydrocarbon group, alkoxy group, and allyloxy group having 1–20 carbon atoms, or a polar group shown by —$(CH_2)_k$Y' (wherein Y' represents —C(O)O$R^4$ or —OC(O)$R^5$, $R^4$ and $R^5$ represent a substituent selected from an alkyl group, alkenyl group, cycloalkyl group, and aryl group having 1–20 carbon atoms, and halogen substituted groups of these, and k is an integer from 0 to 5), $B^1$ and $B^2$ or $B^3$ and $B^4$ may form an alkydenyl group, $B^1$ and $B^3$, $B^1$ and $B^4$, $B^2$ and $B^3$, or $B^2$ and $B^4$ may form a cycloalkylene group or a cycloalkenylene group, and p is an integer from 0 to 2.

2. The optically transparent material according to claim 1, further comprising at least one compound selected from a polyfunctional alkoxy compound of a metal selected from Si, Al, Ti, and Zr, and a condensation product of a polyfunctional alkoxy compound of these metals.

3. The optically transparent material according to claim 1, further comprising at least one metal oxide selected from silica, alumina, zirconia, titania, diatomite, montmorillonite, and tin oxide.

4. The optically transparent material according to claim 1, which is crosslinked by allowing the reactive silyl group in the cyclic olefin addition copolymer to form a siloxane bond by hydrolysis and condensation.

5. The optically transparent material according to claim 1, which is in the shape of a film or a sheet.

6. A film for a liquid crystal display device comprising the optically transparent material according to claim 1.

7. A liquid crystal substrate film for a liquid crystal display device comprising the optically transparent material according to claim 1.

8. A polarizing film for a liquid crystal display device comprising the optically transparent material according to claim 1.

9. A surface protective film for a liquid crystal display device comprising the optically transparent material according to claim 1.

10. A retardation film for a liquid crystal display device comprising the optically transparent material according to claim 1.

11. A light diffusion film for a liquid crystal display device comprising the optically transparent material according to claim 1.

12. A transparent conductive film comprising the optically transparent material according to claim 1.

13. A film for an EL display device comprising the optically transparent material according to claim 1.

14. An antireflection film comprising the optically transparent material according to claim 1.

15. A transparent conductive composite material comprising the optically transparent material according to claim 5 and a transparent conductive film formed on the surface of the optically transparent material.

16. The optically transparent material according to claim 1, wherein the diol residue in the reactive silyl group shown by the formula (2) is a diol residue having 2–4 carbon atoms which forms a cyclic structure with the Si atom.

17. The optically transparent material according to claim 1, wherein the content of the repeating unit (a) is 0.5–30 mol %.

18. The optically transparent material according to claim 1, wherein the content of the repeating unit (b) is 60–99.5 mol %.

19. The optically transparent material according to claim 1, having a glass transition temperature of 200–400° C.

20. The optically transparent material according to claim 1, further comprising a structural unit (c) shown by the following formula (7):

$$—CH_2—CH(R^6)—\qquad(7)$$

wherein $R^6$ represents a hydrogen atom, or a substituent selected from an alkyl group, phenyl group, alkyl substituted phenyl group, and trialkyl substituted silyl group.

* * * * *